United States Patent
Qi et al.

(10) Patent No.: US 11,568,033 B2
(45) Date of Patent: Jan. 31, 2023

(54) DATA ENCRYPTION OR DECRYPTION METHOD AND APPARATUS, AND TERMINAL DEVICE

(71) Applicant: HUAWEI TECHNOLOGIES CO., LTD., Guangdong (CN)

(72) Inventors: Yunfei Qi, Wuhan (CN); Yuanli Gan, Shenzhen (CN); Yanan Zhang, Shenzhen (CN); Huaqi Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 16/772,722

(22) PCT Filed: Dec. 12, 2018

(86) PCT No.: PCT/CN2018/120426
§ 371 (c)(1),
(2) Date: Jun. 12, 2020

(87) PCT Pub. No.: WO2019/114712
PCT Pub. Date: Jun. 20, 2019

(65) Prior Publication Data
US 2020/0320182 A1  Oct. 8, 2020

(30) Foreign Application Priority Data
Dec. 13, 2017 (CN) .......................... 201711332671.8

(51) Int. Cl.
*G06F 21/32* (2013.01)
*G06F 3/0484* (2022.01)
(Continued)

(52) U.S. Cl.
CPC ............ *G06F 21/32* (2013.01); *G06F 3/0484* (2013.01); *G06F 3/0488* (2013.01); *G06F 21/602* (2013.01); *G06F 2221/2107* (2013.01)

(58) Field of Classification Search
CPC ...... G06F 3/0484; G06F 3/0488; G06F 21/32; G06F 21/602
See application file for complete search history.

(56) References Cited

U.S. PATENT DOCUMENTS

| 2011/0289423 A1 | 11/2011 | Kim et al. |
| 2015/0220767 A1 | 8/2015 | Yoon et al. |

(Continued)

FOREIGN PATENT DOCUMENTS

| CN | 102637115 A | 8/2012 |
| CN | 103870073 A | 6/2014 |

(Continued)

*Primary Examiner* — Seth A Silverman
(74) *Attorney, Agent, or Firm* — Leydig, Voit & Mayer, Ltd.

(57) ABSTRACT

A data processing method includes: presenting one or more control elements on the touch screen, where the one or more control elements are in a one-to-one correspondence with one or more pieces of data; and encrypting or decrypting, based on fingerprint data obtained by the fingerprint recognition module, first data corresponding to a first control element when an operation of dragging the first control element from a location outside a second region to the second region is detected, where the second region includes at least a partial region of the first region. This can further complete operations of confirming that encryption or decryption is to be performed and performing authentication in one step, to shorten steps and time of a data encryption or decryption operation, thereby improving user experience.

16 Claims, 10 Drawing Sheets

(51) Int. Cl.
G06F 3/0488 (2022.01)
G06F 21/60 (2013.01)

(56) References Cited

U.S. PATENT DOCUMENTS

2017/0220838 A1* 8/2017 He .................... G06F 3/042
2018/0189468 A1* 7/2018 Shim .................. H04W 12/06
2018/0196990 A1* 7/2018 Xu ..................... G06F 21/83
2018/0288049 A1* 10/2018 Donlan ................ H04L 9/085
2018/0365477 A1* 12/2018 Seol .................... H04M 1/725
2020/0092411 A1* 3/2020 Xu ..................... G06V 40/1365

FOREIGN PATENT DOCUMENTS

| CN | 103942481 A | 7/2014 |
| CN | 104408357 A | 3/2015 |
| CN | 104732121 A | 6/2015 |
| CN | 105204904 A | 12/2015 |
| CN | 105653924 A | 6/2016 |
| CN | 105808238 A | 7/2016 |
| CN | 107358083 A | 11/2017 |

* cited by examiner

DATA ENCRYPTION OR DECRYPTION METHOD AND APPARATUS, AND TERMINAL DEVICE

CROSS-REFERENCE TO RELATED APPLICATIONS

This application is a National Stage of International Application No. PCT/CN2018/120426, filed on Dec. 12, 2018, which claims priority to Chinese Patent Application No. 201711332671.8, filed on Dec. 13, 2017. The disclosures of the aforementioned applications are hereby incorporated by reference in their entireties.

TECHNICAL FIELD

This application relates to a data processing method and apparatus, and a terminal device, and more specifically, to a data encryption or decryption method and apparatus, and a terminal device.

BACKGROUND

Currently, during use of a terminal device, there are many scenarios in which encryption and decryption need to be performed. For example, a user can encrypt, by using a password or a fingerprint, some information or pictures that the user does not want others to view. In this way, other users cannot view the information or pictures, or they need to enter the password or verify the fingerprint for viewing. When the user needs to view the encrypted content, the user decrypts the content by entering the password or verifying the fingerprint, so that the content can be normally accessed.

In an existing encryption or decryption process, to-be-encrypted or to-be-decrypted data needs to be selected first; an encryption operation or a decryption operation is confirmed to be performed; an authentication manner such as verifying a fingerprint or entering a password is popped up for user authentication; and encryption or decryption is completed after the authentication succeeds. In this process, a multistep operation is required from to-be-encrypted/to-be-decrypted data selection to authentication completion. Consequently, steps are complex and time-consuming, and user experience is poor.

Therefore, a technology for shortening steps and time of a data encryption or decryption operation urgently needs to be provided, thereby improving user experience.

SUMMARY

This application provides a data encryption or decryption method and apparatus, and a terminal, to complete operations of confirming that encryption or decryption is to be performed and performing authentication in one step. This shortens steps and time of a data encryption or decryption operation, thereby improving user experience.

According to a first aspect, a data processing method is provided. The method is performed in a terminal device including a touch screen and a fingerprint recognition module. The touch screen is parallel to or approximately parallel to a configuration plane of the fingerprint recognition module, projection of the fingerprint recognition module on the touch screen is located in a first region, and the first region is a partial region of the touch screen. The method includes: presenting one or more control elements on the touch screen, where the one or more control elements are in a one-to-one correspondence with one or more pieces of data; and encrypting or decrypting, based on fingerprint data obtained by the fingerprint recognition module, first data corresponding to a first control element when an operation of dragging the first control element from a location outside a second region to the second region is detected, where the second region includes at least a partial region of the first region.

According to the data encryption or decryption method provided in this embodiment of this application, based on the fingerprint recognition module disposed on a screen of the touch screen, the terminal device detects this coherent dragging action to complete operations of confirming that encryption or decryption is to be performed and performing authentication in one step. When the terminal device detects that one or more control elements are dragged to a specific region range, data encryption or decryption is completed based on the fingerprint data obtained by the fingerprint recognition module. The specific region range includes at least a partial region of a fingerprint recognition region determined by the fingerprint recognition module. Such a method can complete the operations of confirming that encryption or decryption is to be performed and performing authentication in one step, to shorten steps and time of the data encryption or decryption operation and make the operation more coherent, thereby improving user experience.

With reference to the first aspect, in a first implementation of the first aspect, the encrypting or decrypting, based on fingerprint data obtained by the fingerprint recognition module, first data corresponding to a first control element when an operation of dragging the first control element from a location outside a second region to the second region is detected includes: when the operation of dragging the first control element from the location outside the second region to the second region is detected, controlling the fingerprint recognition module to collect fingerprint data; and after it is determined that the fingerprint data is valid, encrypting or decrypting the first data corresponding to the first control element.

With reference to the first aspect and the foregoing implementation of the first aspect, in a second implementation of the first aspect, before the operation of dragging the first control element from the location outside the second region to the second region is detected, the method further includes: controlling the fingerprint recognition module to collect fingerprint data, and determining whether the fingerprint data is valid; and the encrypting or decrypting, based on fingerprint data obtained by the fingerprint recognition module, first data corresponding to a first control element includes: after it is determined that the fingerprint data is valid, encrypting or decrypting the first data corresponding to the first control element.

When the terminal device detects a coherent operation of dragging one or more control elements to a specific region range, this case may be used as a trigger manner to trigger the terminal device to complete data encryption or decryption based on the fingerprint data obtained by the fingerprint recognition module. Alternatively, the dragging operation may be used as a trigger manner to trigger the terminal device to control the fingerprint recognition module to collect fingerprint data. Alternatively, the dragging operation may be used as a trigger manner to trigger the terminal device to control the fingerprint recognition module to collect fingerprint data, determine whether the fingerprint data is valid, and after it is determined that the fingerprint data is valid, encrypt or decrypt the first data corresponding to the first control element. Such a method can complete the operations of confirming that encryption or decryption is to be performed and performing authentication in one step, to shorten steps and time of the data encryption or decryption operation and make the operation more coherent, thereby improving user experience.

With reference to the first aspect and the foregoing implementations of the first aspect, in a third implementation of the first aspect, the encrypting or decrypting, based on fingerprint data obtained by the fingerprint recognition module, first data corresponding to a first control element when an operation of dragging the first control element from a location outside a second region to the second region is detected includes: when the operation of dragging the first control element from the location outside the second region to the second region is detected, and a first overlapping range is greater than or equal to a first preset value, encrypting or decrypting, based on the fingerprint data obtained by the fingerprint recognition module, the first data corresponding to the first control element, where the first overlapping range is a range corresponding to an overlapping part between the first control element and the first region; or when the operation of dragging the first control element from the location outside the second region to the second region is detected, and a first overlapping ratio is greater than or equal to a second preset value, encrypting or decrypting, based on the fingerprint data obtained by the fingerprint recognition module, the first data corresponding to the first control element, where the first overlapping ratio is a ratio of a range corresponding to an overlapping part between the first control element and the first region to a range occupied by the first control element, or the first overlapping ratio is a ratio of a range corresponding to an overlapping part between the first control element and the first region to the first region.

During detection performed by the terminal device, an operation process of dragging a control element is dragging the control element from a location outside the second region to a location in the second region. A range of the second region includes at least a partial region of the fingerprint recognition region determined by the fingerprint recognition module. However, that the operation is an operation used for data encryption and decryption can be ensured, only when the control element enters the fingerprint recognition region, that is, a region in which a fingerprint can be obtained and recognized. Therefore, in this embodiment, an overlapping area or an overlapping ratio between a range occupied by the one or more control elements and the fingerprint recognition region is detected to reduce a detection error, so as to prevent a misoperation. In addition, sufficient time can be reserved for a fingerprint recognition module to perform fingerprint recognition, thereby ensuring detection accuracy and improving user experience. A display region of the one or more control elements and the fingerprint recognition region may be irregular graphs. Therefore, by determining that an overlapping ratio between a range occupied by the control element and the fingerprint recognition region is greater than or equal to a preset threshold, that this case triggers the terminal device to perform encryption, decryption, or the like can be determined. Such a method can prevent a misoperation and reduce an error detection rate, thereby ensuring detection accuracy and improving user experience.

With reference to the first aspect and the foregoing implementations of the first aspect, in a fourth implementation of the first aspect, the encrypting or decrypting, based on fingerprint data obtained by the fingerprint recognition module, first data corresponding to a first control element when an operation of dragging the first control element from a location outside a second region to the second region is detected includes: when the operation of dragging the first control element from the location outside the second region to the second region is detected, and a dwell time of the first control element in the second region is greater than or equal to a third preset value, encrypting or decrypting, based on the fingerprint data obtained by the fingerprint recognition module, the first data corresponding to the first control element.

In the process of detecting the dragging operation by the terminal device, a display location of the first control element changes according to a track of the dragging operation. The dwell time of the control element in the second region after the control element is dragged from the location outside the second region to the second region is limited, so as to prevent a misoperation and reduce an error detection rate. In addition, sufficient time can be reserved for the fingerprint recognition module to perform fingerprint recognition, thereby ensuring detection accuracy and improving user experience.

With reference to the first aspect and the foregoing implementations of the first aspect, in a fifth implementation of the first aspect, before the encrypting or decrypting, based on fingerprint data obtained by the fingerprint recognition module, first data corresponding to a first control element when an operation of dragging the first control element from a location outside a second region to the second region is detected, the method further includes: presenting a first graph on the touch screen, where the first graph is used to identify a location of the second region.

With reference to the first aspect and the foregoing implementations of the first aspect, in a sixth implementation of the first aspect, the presenting a first graph includes: presenting the first graph when a specified trigger operation is detected.

With reference to the first aspect and the foregoing implementations of the first aspect, in a seventh implementation of the first aspect, the trigger operation includes a touch and hold operation on the first control element.

During detection performed by the terminal device, to implement energy saving of the terminal device, there may be a plurality of cases. For example, the fingerprint recognition region determined by the fingerprint recognition module is not displayed on the touch screen. In this case, to accurately and quickly drag one or more control elements to the fingerprint recognition region, presenting a location of the first region, that is, the first graph, on the touch screen needs to be triggered first. There are a plurality of trigger manners, for example, touching and holding the touch screen. This embodiment of this application is not limited thereto. Such an operation can display the fingerprint recognition region, that is, the first region, so as to identify the second region, and ensure that the one or more control elements are accurately and quickly dragged to the fingerprint recognition region. This not only can save energy, but also prevent a misoperation, and shorten time for data encryption or decryption, thereby improving user experience.

Before the terminal device detects the dragging operation process, after the one or more control elements are presented on the touch screen, one or more control elements need to be selected as the first control element, and it is determined that first data corresponding to the first control element is data that can be encrypted or decrypted. When detecting that a specified touch operation is performed on the first control element, the terminal device determines that the first data needs to be encrypted or decrypted. In an implementation, the touch operation may be touching and holding the first control element, and determining the first control element as an element that needs to be encrypted or decrypted. In this way, a misoperation can be prevented, and an element that can be encrypted or decrypted is determined before fingerprint data is obtained, thereby improving user experience.

According to a second aspect, a data processing apparatus is provided, including: a touch screen, where one or more control elements are presented on the touch screen, and the one or more control elements are in a one-to-one correspondence with one or more pieces of data; a fingerprint recognition module, where a configuration plane of the fingerprint recognition module is parallel or approximately parallel to the touch screen, projection of the fingerprint recognition module on the touch screen is located in a first region, and the first region is a partial region of the touch screen; and a control module, configured to: when an operation of dragging a first control element from a location outside a second region to the second region is detected, encrypt or decrypt, based on fingerprint data obtained by the fingerprint recognition module, first data corresponding to the first control element, where the second region includes at least a partial region of the first region.

According to the data encryption or decryption apparatus provided in this embodiment of this application, based on the fingerprint recognition module disposed on a screen of the touch screen, this coherent dragging action is detected to complete operations of confirming that encryption or decryption is to be performed and performing authentication in one step. When a terminal device detects that one or more control elements are dragged to a specific region range, data encryption or decryption is completed based on the fingerprint data obtained by the fingerprint recognition module. The specific region range includes at least a partial region of a fingerprint recognition region determined by the fingerprint recognition module. Such a method can complete the operations of confirming that encryption or decryption is to be performed and performing authentication in one step, to shorten steps and time of the data encryption or decryption operation and make the operation more coherent, thereby improving user experience.

With reference to the second aspect, in a first implementation of the second aspect, the control module is further configured to: when the operation of dragging the first control element from the location outside the second region to the second region is detected, control the fingerprint recognition module to collect fingerprint data; and after it is determined that the fingerprint data is valid, encrypt or decrypt the first data corresponding to the first control element.

With reference to the second aspect and the foregoing implementation of the second aspect, in a second implementation of the second aspect, the control module is further configured to: control the fingerprint recognition module to collect fingerprint data, and determine whether the fingerprint data is valid; and the encrypting or decrypting, based on fingerprint data obtained by the fingerprint recognition module, first data corresponding to the first control element includes: after it is determined that the fingerprint data is valid, encrypting or decrypting the first data corresponding to the first control element.

When the terminal device detects a coherent operation of dragging one or more control elements to a specific region range, this case may be used as a trigger manner to trigger the terminal device to complete data encryption or decryption based on the fingerprint data obtained by the fingerprint recognition module. Alternatively, the dragging operation may be used as a trigger manner to trigger the terminal device to control the fingerprint recognition module to collect fingerprint data. Alternatively, the dragging operation may be used as a trigger manner to trigger the terminal device to control the fingerprint recognition module to collect fingerprint data, determine whether the fingerprint data is valid, and after it is determined that the fingerprint data is valid, encrypt or decrypt the first data corresponding to the first control element. Such a method can complete the operations of confirming that encryption or decryption is to be performed and performing authentication in one step, to shorten steps and time of the data encryption or decryption operation and make the operation more coherent, thereby improving user experience.

With reference to the second aspect and the foregoing implementations of the second aspect, in a third implementation of the second aspect, the control module is further configured to: when the operation of dragging the first control element from the location outside the second region to the second region is detected, and a first overlapping range is greater than or equal to a first preset value, encrypt or decrypt, based on the fingerprint data obtained by the fingerprint recognition module, the first data corresponding to the first control element, where the first overlapping range is a range corresponding to an overlapping part between the first control element and the first region; or when the operation of dragging the first control element from the location outside the second region to the second region is detected, and a first overlapping ratio is greater than or equal to a second preset value, encrypt or decrypt, based on the fingerprint data obtained by the fingerprint recognition module, the first data corresponding to the first control element, where the first overlapping ratio is a ratio of a range corresponding to an overlapping part between the first control element and the first region to a range occupied by the first control element, or the first overlapping ratio is a ratio of a range corresponding to an overlapping part between the first control element and the first region to the first region.

During detection performed by the terminal device, an operation process of dragging a control element is dragging the control element from a location outside the second region to a location in the second region. A range of the second region includes at least a partial region of the fingerprint recognition region determined by the fingerprint recognition module. However, that the operation is an operation used for data encryption and decryption can be ensured, only when the control element enters the fingerprint recognition region, that is, a region in which a fingerprint can be obtained and recognized. Therefore, in this embodiment, an overlapping area or an overlapping ratio between a range occupied by the one or more control elements and the fingerprint recognition region is detected to reduce a detection error, so as to prevent a misoperation. In addition, sufficient time can be reserved for a fingerprint recognition module to perform fingerprint recognition, thereby ensuring detection correctness and improving user experience. A display region of the one or more control elements and the fingerprint recognition region may be irregular graphs. Therefore, by determining that an overlapping ratio between a range occupied by the control element and the fingerprint recognition region is greater than or equal to a preset threshold, that this case triggers the terminal device to perform encryption, decryption, or the like can be determined. Such a method can prevent a misoperation and reduce an error detection rate, thereby ensuring detection correctness and improving user experience.

With reference to the second aspect and the foregoing implementations of the second aspect, in a fourth implementation of the second aspect, the control module is further configured to: when the operation of dragging the first control element from the location outside the second region to the second region is detected, and a dwell time of the first control element in the second region is greater than or equal to a third preset value, encrypt or decrypt, based on the fingerprint data obtained by the fingerprint recognition module, the first data corresponding to the first control element.

In the process of detecting the dragging operation by the terminal device, a display location of the first control element changes according to a track of the dragging operation. The dwell time of the control element in the second region after the control element is dragged from the location outside the second region to the second region is limited, so as to prevent a misoperation and reduce an error detection rate. In addition, sufficient time can be reserved for the fingerprint recognition module to perform fingerprint recognition, thereby ensuring detection correctness and improving user experience.

With reference to the second aspect and the foregoing implementations of the second aspect, in a fifth implementation of the second aspect, the control module is further configured to instruct to present a first graph on the touch screen, where the first graph is used to identify a location of the second region.

With reference to the second aspect and the foregoing implementations of the second aspect, in a sixth implementation of the second aspect, the presenting a first graph includes: presenting the first graph when a specified trigger operation is detected.

With reference to the second aspect and the foregoing implementations of the second aspect, in a seventh implementation of the second aspect, the trigger operation includes a touch and hold operation on the first control element.

During detection performed by the terminal device, to implement energy saving of the terminal device, there may be a plurality of cases. For example, the fingerprint recognition region determined by the fingerprint recognition module is not displayed on the touch screen. In this case, to accurately and quickly drag one or more control elements to the fingerprint recognition region, presenting a location of the first region, that is, the first graph, on the touch screen needs to be triggered first. There are a plurality of trigger manners, for example, touching and holding the touch screen. This embodiment of this application is not limited thereto. Such an operation can display the fingerprint recognition region, that is, the first region, so as to identify the second region, and ensure that the one or more control elements are accurately and quickly dragged to the fingerprint recognition region. This not only can save energy, but also prevent a misoperation, and shorten time for data encryption or decryption, thereby improving user experience.

Before the terminal device detects the dragging operation process, after the one or more control elements are presented on the touch screen, one or more control elements need to be selected as the first control element, and it is determined that first data corresponding to the first control element is data that can be encrypted or decrypted. When detecting that a specified touch operation is performed on the first control element, the terminal device determines that the first data needs to be encrypted or decrypted. In an implementation, the touch operation may be touching and holding the first control element, and determining the first control element as an element that needs to be encrypted or decrypted. In this way, a misoperation can be prevented, and an element that can be encrypted or decrypted is determined before fingerprint data is obtained, thereby improving user experience.

According to a third aspect, a terminal device is provided, including: a touch screen; a fingerprint recognition module, where a configuration plane of the fingerprint recognition module is parallel or approximately parallel to the touch screen, projection of the fingerprint recognition module on the touch screen is located in a first region, and the first region is a partial region of the touch screen; and a processor, configured to perform the method according to any one of the first aspect or the possible implementations of the first aspect.

According to a fourth aspect, an apparatus is provided, including: one or more processors and one or more memories coupled to the one or more processors, where the one or more memories are configured to store computer program code, where the computer program code includes a computer instruction; and the one or more processors are configured to execute the computer instruction and implement the following functions: instructing a touch screen connected to the apparatus to present one or more control elements, where the one or more control elements are in a one-to-one correspondence with one or more pieces of data; and when an operation of dragging a first control element from a location outside a second region to the second region is detected, encrypting or decrypting, based on fingerprint data obtained by a fingerprint recognition module, first data corresponding to the first control element, where the second region includes at least a partial region of the first region.

According to the apparatus provided in this embodiment of this application, the terminal device detects, by using the processor of the apparatus, this coherent dragging action to complete operations of confirming that encryption or decryption is to be performed and performing authentication in one step. When the processor of the apparatus detects that one or more control elements are dragged to a specific region range, data encryption or decryption is completed based on the fingerprint data obtained by the fingerprint recognition module. The specific region range includes at least a partial region of a fingerprint recognition region determined by the fingerprint recognition module. Such a method can complete the operations of confirming that encryption or decryption is to be performed and performing authentication in one step, to shorten steps and time of the data encryption or decryption operation and make the operation more coherent, thereby improving user experience.

With reference to the fourth aspect, in a first implementation of the fourth aspect, the one or more processors are further configured to: when the operation of dragging the first control element from the location outside the second region to the second region is detected, control the fingerprint recognition module to collect fingerprint data; and after it is determined that the fingerprint data is valid, encrypt or decrypt the first data corresponding to the first control element.

With reference to the fourth aspect, in a second implementation of the fourth aspect, the one or more processors are further configured to: control a fingerprint recognition module to collect fingerprint data, and determine whether the fingerprint data is valid; and the encrypting or decrypting, based on fingerprint data obtained by the fingerprint recognition module, first data corresponding to the first control element includes: after it is determined that the fingerprint data is valid, encrypting or decrypting the first data corresponding to the first control element.

When the processor of the apparatus detects a coherent operation of dragging one or more control elements to a specific region range, this case may be used as a trigger manner to trigger the terminal device to complete data encryption or decryption based on the fingerprint data obtained by the fingerprint recognition module. Alternatively, the dragging operation may be used as a trigger manner to trigger the terminal device to control the fingerprint recognition module to collect fingerprint data. Alternatively, the dragging operation may be used as a trigger manner to trigger the terminal device to control the fingerprint recognition module to collect fingerprint data, determine whether the fingerprint data is valid, and after it is determined that the fingerprint data is valid, encrypt or decrypt the first data corresponding to the first control element. Such a method can complete the operations of confirming that encryption or decryption is to be performed and performing authentication in one step, to shorten steps and time of the data encryption or decryption operation and make the operation more coherent, thereby improving user experience.

With reference to the fourth aspect, in a third implementation of the fourth aspect, the one or more processors are further configured to: when the operation of dragging the first control element from the location outside the second region to the second region is detected, and a first overlapping range is greater than or equal to a first preset value, encrypt or decrypt, based on the fingerprint data obtained by the fingerprint recognition module, the first data corresponding to the first control element, where the first overlapping range is a range corresponding to an overlapping part between the first control element and the first region; or when the operation of dragging the first control element from the location outside the second region to the second region is detected, and a first overlapping ratio is greater than or equal to a second preset value, encrypt or decrypt, based on the fingerprint data obtained by the fingerprint recognition module, the first data corresponding to the first control element, where the first overlapping ratio is a ratio of a range corresponding to an overlapping part between the first control element and the first region to a range occupied by the first control element, or the first overlapping ratio is a ratio of a range corresponding to an overlapping part between the first control element and the first region to the first region.

During detection performed by the apparatus, an operation process of dragging a control element is dragging the control element from a location outside the second region to a location in the second region. A range of the second region includes at least a partial region of the fingerprint recognition region determined by the fingerprint recognition module. However, that the operation is an operation used for data encryption and decryption can be ensured, only when the control element enters the fingerprint recognition region, that is, a region in which a fingerprint can be obtained and recognized. Therefore, in this embodiment, an overlapping area or an overlapping ratio between a range occupied by the one or more control elements and the fingerprint recognition region is detected to reduce a detection error, so as to prevent a misoperation. In addition, sufficient time can be reserved for a fingerprint recognition module to perform fingerprint recognition, thereby ensuring detection correctness and improving user experience. A display region of the one or more control elements and the fingerprint recognition region may be irregular graphs. Therefore, by determining that an overlapping ratio between a range occupied by the control element and the fingerprint recognition region is greater than or equal to a preset threshold, that this case triggers the terminal device to perform encryption, decryption, or the like can be determined. Such a method can prevent a misoperation and reduce an error detection rate, thereby ensuring detection correctness and improving user experience.

With reference to the fourth aspect, in a fourth implementation of the fourth aspect, the one or more processors are further configured to: when the operation of dragging the first control element from the location outside the second region to the second region is detected, and a dwell time of the first control element in the second region is greater than or equal to a third preset value, encrypt or decrypt, based on the fingerprint data obtained by the fingerprint recognition module, the first data corresponding to the first control element.

In the process of detecting the dragging operation by the processor of the apparatus, a display location of the first control element changes according to a track of the dragging operation. The dwell time of the control element in the second region after the control element is dragged from the location outside the second region to the second region is limited, so as to prevent a misoperation and reduce an error detection rate. In addition, sufficient time can be reserved for a fingerprint recognition module to perform fingerprint recognition, thereby ensuring detection correctness and improving user experience.

With reference to the fourth aspect, in a fifth implementation of the fourth aspect, the one or more processors are further configured to instruct to present a first graph on the touch screen, where the first graph is used to identify a location of the second region.

With reference to the fourth aspect, in a sixth implementation of the fourth aspect, the presenting a first graph includes: presenting the first graph when a specified trigger operation is detected.

With reference to the fourth aspect, in a seventh implementation of the fourth aspect, the trigger operation includes a touch and hold operation on the first control element.

With reference to the fourth aspect, in an eighth implementation of the fourth aspect, the one or more processors are further configured to: when the operation of dragging the first control element from the location outside the second region to the second region is detected, and the first data is encrypted data, decrypt, based on the fingerprint data obtained by the fingerprint recognition module, the first data corresponding to the first control element; or when the operation of dragging the first control element from the location outside the second region to the second region is detected, and the first data is unencrypted data, encrypt, based on the fingerprint data obtained by the fingerprint recognition module, the first data corresponding to the first control element.

During detection performed by the processor of the apparatus, to implement energy saving of the terminal device, there may be a plurality of cases. For example, the fingerprint recognition region determined by the fingerprint recognition module is not displayed on the touch screen. In this case, to accurately and quickly drag one or more control elements to the fingerprint recognition region, presenting a location of the first region, that is, the first graph, on the touch screen needs to be triggered first. There are a plurality of trigger manners, for example, touching and holding the touch screen. This embodiment of this application is not limited thereto. Such an operation can display the fingerprint recognition region, that is, the first region, so as to identify the second region, and ensure that the one or more control elements are accurately and quickly dragged to the fingerprint recognition region. This not only can save energy, but also prevent a misoperation, and shorten time for data encryption or decryption, thereby improving user experience.

Before the processor of the apparatus detects the dragging operation process, after the one or more control elements are presented on the touch screen, one or more control elements need to be selected as the first control element, and it is determined that first data corresponding to the first control element is data that can be encrypted or decrypted. When detecting that a specified touch operation is performed on the first control element, the terminal device determines that the first data needs to be encrypted or decrypted. In an implementation, the touch operation may be touching and holding the first control element, and determining the first control element as an element that needs to be encrypted or decrypted. In this way, a misoperation can be prevented, and an element that can be encrypted or decrypted is determined before fingerprint data is obtained, thereby improving user experience.

According to a fifth aspect, a computer readable storage medium is provided, including a computer instruction, where when the computer instruction runs on a terminal, the terminal is enabled to perform the method according to any one of the first aspect or the possible implementations of the first aspect.

According to a sixth aspect, a computer program product is provided, where when the computer program product is run on a computer, the computer is enabled to perform the method according to any one of the first aspect or the possible implementations of the first aspect.

DESCRIPTION OF EMBODIMENTS

The following describes technical solutions in this application with reference to accompanying drawings.

During use of a terminal device, there are many scenarios in which encryption and decryption need to be performed. An encryption operation is to translate a readable plaintext and add, for the data, a permission that requires a password for access. An inverse process of the encryption operation is referred to as decryption, that is, revoking a confidentiality permission for the data, so that the data can be accessed. For example, a user can encrypt, by using a password or a fingerprint, some information or pictures that the user does not want others to view. In this way, other users cannot view the information or pictures, or they need to enter the password or verify the fingerprint for viewing. When the user needs to view the encrypted content, the user decrypts the content by entering the password or verifying the fingerprint, so that the content can be normally accessed. Data encryption or decryption is an important mechanism for ensuring data security, and has functions of preventing a confidential data file from being disclosed or tampered with, preventing a privileged user from viewing a private data file, and the like.

The embodiments of this application relate to a terminal device. The terminal device is also referred to as a terminal, user equipment (UE), or an intelligent device. For example, the terminal device may be a smartphone, a tablet computer, a notebook computer, a digital camera, or a vehicle-mounted intelligent device, or may be another wearable intelligent device with a fingerprint recognition function. The wearable intelligent device is a generic term of wearable devices that are obtained through intelligent design and development of daily wear by applying a wearable technology, for example, glasses, gloves, watches, clothes, and shoes. A wearable device is a portable device that can be directly worn on a body or integrated into clothes or an accessory of a user. The wearable device is not only a hardware device, but implements a powerful function through software support, data exchange, and cloud interaction. Generalized wearable intelligent devices include full-featured and large-sized devices that can implement complete or partial functions without depending on smartphones, for example, smart watches or smart glasses, and devices that focus on only one type of application function and need to work with other devices such as smartphones, for example, various smart bands for monitoring physical signs or smart jewelry.

The following briefly describes data encryption and decryption processes performed by a terminal device in the prior art.

Figure 1:
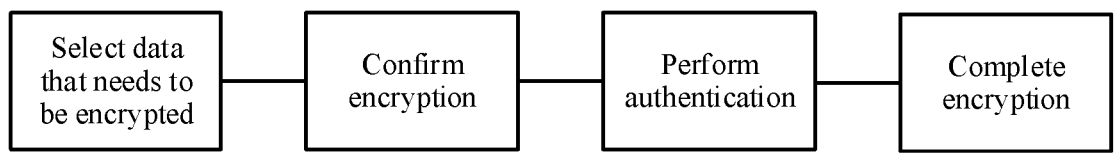
FIG. 1 shows a scheme for performing encryption by a terminal device in the prior art.

FIG. 1 shows the encryption process performed by the terminal device in the prior art. Referring to FIG. 1, the encryption process in the prior art includes: first selecting data that needs to be encrypted, determining that an encryption operation is to be performed, and then popping up an authentication manner such as verifying a fingerprint or entering a password for user authentication, and completing encryption after the authentication succeeds.

Figure 2:
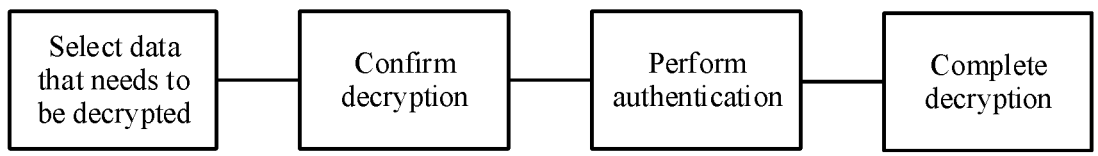
FIG. 2 shows a scheme for performing decryption by a terminal device in the prior art.

FIG. 2 shows the decryption process performed by the terminal device in the prior art. Referring to FIG. 2, a decryption process in the prior art includes: first selecting content that needs to be decrypted; confirming that a decryption operation is to be performed; and popping up an authentication manner such as verifying a fingerprint or entering a password for user authentication, and completing decryption after the authentication succeeds.

It can be learned from the foregoing that, a multistep operation is required from selecting the to-be-encrypted or to-be-decrypted data to completing the authentication by the terminal device in the prior art. Consequently, steps are complex and time-consuming, and user experience is poor.

Therefore, an embodiment of this application provides a data encryption or decryption method, to reduce steps of conventional data encryption or decryption, and complete encryption or decryption and authentication in one step, thereby improving user experience.

Figure 3:
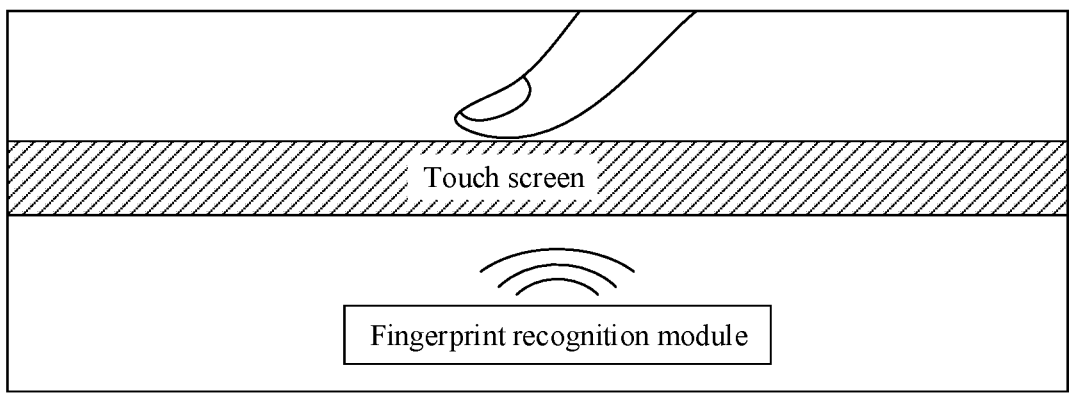
FIG. 3 is a schematic installation diagram of a touch screen and a fingerprint recognition module.

In this embodiment of this application, a terminal device includes a touch screen, a fingerprint recognition module, and a control module. The fingerprint recognition module is disposed below the touch screen. Specifically, the touch screen is parallel to or approximately parallel to a configuration plane of the fingerprint recognition module. FIG. 3 is a schematic installation diagram of the touch screen and the fingerprint recognition module. Projection of the fingerprint recognition module on the touch screen is located in a first region, and the first region is a partial region or an entire region of the touch screen.

This embodiment of this application relates to a fingerprint recognition module. The fingerprint recognition module is configured to determine a fingerprint recognition region, that is, the first region. A fingerprint sensor in the fingerprint recognition module may be an optical fingerprint collection sensor, a capacitive fingerprint collection sensor, an ultrasonic fingerprint collection sensor, or the like. It should be understood that this embodiment of this application is not limited thereto.

In the prior art, a fingerprint recognition function is a standard configuration of a smartphone. In a conventional solution, a fingerprint recognition button is designed by using an independent physical button or a virtual button. For example, in some smartphones, fingerprint recognition modules are integrated into front-facing home buttons of the mobile phones, and the home buttons serve as fingerprint recognition buttons. The fingerprint recognition module includes a fingerprint sensor. Currently, when an increasingly large quantity of mobile phone manufacturers start to use an ultra-narrow bezel design to reduce a size of a smartphone, there is no sufficient space below a display screen of the smartphone to place a fingerprint recognition button. In view of this problem, a technology for fingerprint recognition on a display screen is proposed. The technology for fingerprint recognition on a display screen means: A fingerprint recognition function is completely integrated into a display screen, and a user can lightly touch a specified region of the display screen of an intelligent terminal directly to implement fingerprint recognition. The technology for fingerprint recognition on a display screen can meet an ultra-narrow bezel design requirement currently proposed by mobile phone manufacturers, and can make a design of a smartphone simpler. Therefore, applying the technology for fingerprint recognition on a display screen to an intelligent terminal is a future development trend.

Figure 4:
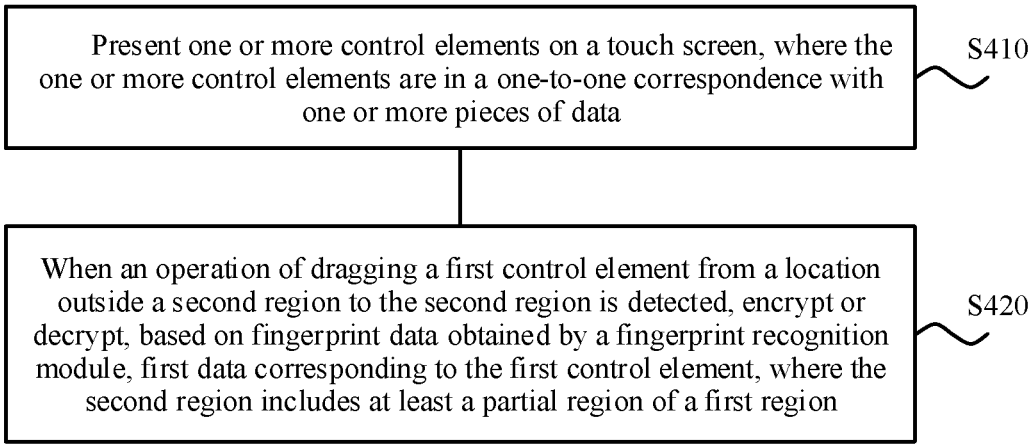
FIG. 4 is a schematic flowchart of a data processing method according to an embodiment of this application.

FIG. 4 is a schematic flowchart of a data processing method according to an embodiment of this application. The method 400 in FIG. 4 may be performed by a terminal device. The method 400 in FIG. 4 includes S410 and S420. The following describes S410 and S420 in detail.

According to the data encryption or decryption method provided in this embodiment of this application, based on a fingerprint recognition module disposed on a screen of a touch screen, the terminal device detects that a coherent dragging action to complete operations of confirming that encryption or decryption is to be performed and performing authentication in one step. When the terminal device detects that one or more control elements are dragged to a specific region range, data encryption or decryption is completed based on fingerprint data obtained by the fingerprint recognition module. The specific region range includes at least a partial region of a fingerprint recognition region determined by the fingerprint recognition module. Such a method can complete the operations of confirming that encryption or decryption is to be performed and performing authentication in one step, to shorten steps and time of the data encryption or decryption operation and make the operation more coherent, thereby improving user experience.

In S410, one or more control elements are presented on the touch screen, where the one or more control elements are in a one-to-one correspondence with one or more pieces of data.

As a most basic element of an organization interface, the control element is an element that can be controlled through a direct operation. Based on a specific attribute of the control element, the control element needs to have two basic features: contactable and changeable. In a human-computer interaction process, a user needs to implement an operation on a control element by processing data. Therefore, the control element needs to be presented on the touch screen, and the control element is in a one-to-one correspondence with data. One or more control elements may be in a one-to-one correspondence with one or more pieces of data. The control element may be information such as a picture, a text, a video, a link, a folder, and application software, and this embodiment of this application is not limited thereto.

In a specific application process, a control element is presented on the terminal device, and occupies a specific region range. For example, one control element occupies an area of three grids. Alternatively, an occupied range is described by using a pixel size, for example, 256×256 pixels. This embodiment of this application is not limited thereto.

After the one or more control elements are presented on the touch screen, one or more control elements need to be selected as a first control element, or in other words, the first control element may include one or more control elements. The first control element is corresponding to first data, and it is determined that the first data is data that can be encrypted or decrypted. When detecting that a specified touch operation is performed on the first control element, the terminal device determines that the first data needs to be encrypted or decrypted. In an implementation, the touch operation may be touching and holding the first control element, and determining the first control element as a dragable interface element. A display location of the first control element can change according to a track of a dragging operation. It should be understood that, this embodiment of this application is not limited thereto.

In S420, when an operation of dragging the first control element from a location outside a second region to the second region is detected, first data corresponding to the first control element is encrypted or decrypted based on fingerprint data obtained by the fingerprint recognition module.

Projection of the fingerprint recognition module on the touch screen is located in a first region. It should be understood that, the first region is a partial region of the touch screen, and a fingerprint may be obtained and recognized in the first region. However, fingerprint obtaining may be started before a control element completely enters the first region. For example, when a fingerprint is partially entered the fingerprint recognition region, fingerprint data may start to be obtained. Therefore, a second region is introduced in this embodiment of this application, and the second region includes at least a partial region of the first region. Optionally, a range of the second region may be greater than or equal to that of the first region. This embodiment of this application is not limited thereto.

During use of the terminal device, there are a plurality of operations, for example, a "tap", which is also referred to as a "click", that is, lightly touch a screen. For a touch screen mobile phone in which any operating system is installed, this "tap" operation is a most frequent action, and is mainly used to enable an application. "Click and hold", also referred to as "touch and hold", means pressing and holding a screen for more than two seconds. This action is usually used to call a "menu". In some applications, a menu can be called by touching and holding a blank region on an interface. This action may also be used for multi-selection and fast view. For example, in a "gallery (album)", multi-selection may be performed on folders by touching and holding an album folder in a default view. After opening an album folder, multi-selection may also be performed on photos by touching and holding a photo. After the selection, operations such as sending or deleting photos may be performed in batches.

"Double-tap" means tapping a screen twice in a short time, and is mainly used for fast zoom. For example, during picture browsing, a picture can be zoomed in quickly by double-tapping the picture, and the picture can be reset by double-tapping the picture again. For example, during web browsing, double-tapping a text part of an article enables a text to adapt to a screen. Certainly, double-tapping some video players enables switching to a full-screen mode.

"Drag", exactly referred to as "hold down and drag", means determining a control element as a dragable element by touching and holding. "Drag" is a common action during editing on a home screen. During dragging, a control element moves along a dragging track. For example, "drag" is used for location editing for control elements such as a widget and an icon on a desktop. In addition, "drag" is also used for progress locating. For example, during music or video playing, a progress bar usually needs to be dragged. Swipe is also considered as a common operation. This operation is mainly used to view a page that cannot be completely displayed on a screen, and is mainly used to view a picture, a web page, and a plain text (an SMS messages, an email, or a note).

Figure 5:
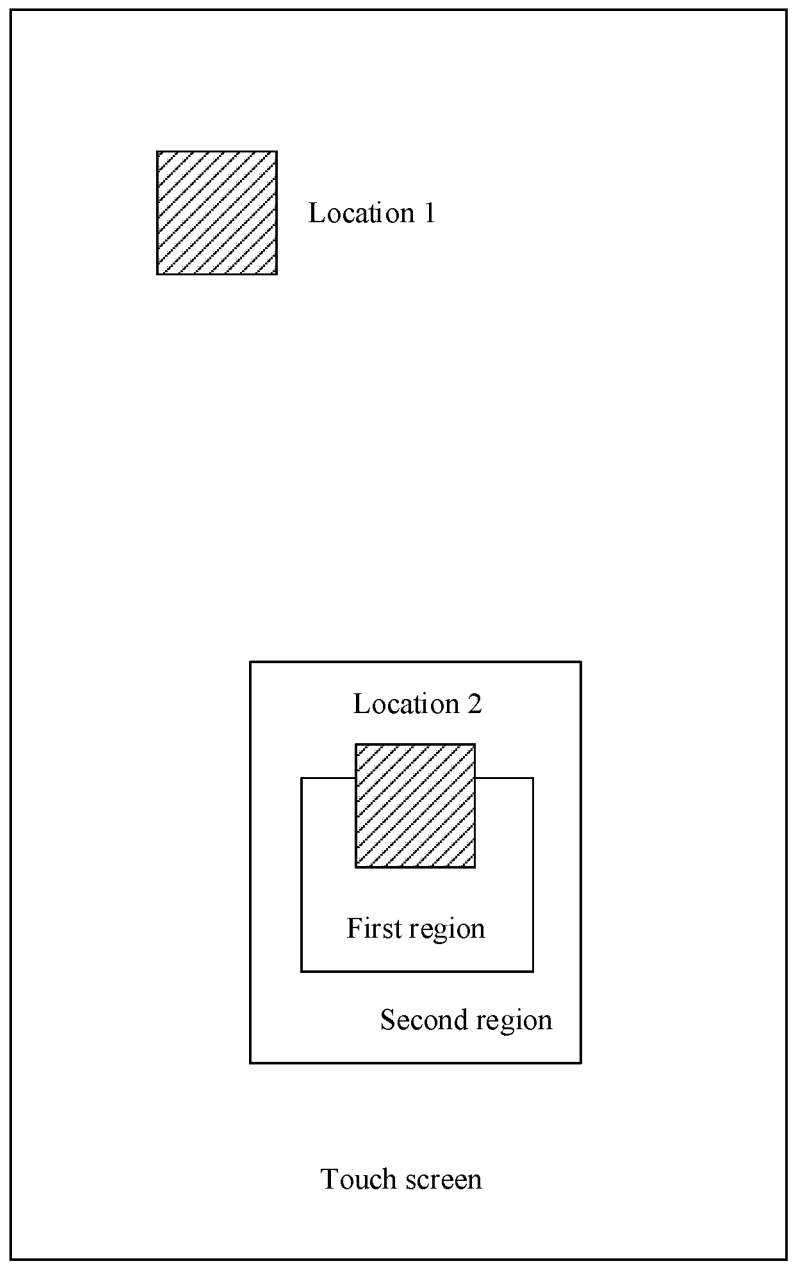
FIG. 5 shows an example of a data processing method according to an embodiment of this application.

When a display location of the first control element is outside the first region in which the projection of the fingerprint recognition module on the touch screen is located, the first control element needs to be moved, by using a dragging operation, from the current display location to a range in which fingerprint data can be obtained, that is, the second region. The second region includes at least a partial region of the fingerprint recognition region determined by the fingerprint recognition module (that is, the first region). As shown in a schematic diagram of FIG. 5, shaded boxes in the figure represent first control elements in different locations: locations 1 and 2; a small rectangular box represents a fingerprint recognition region determined by the fingerprint recognition module, that is, a first region; and a middle rectangular box adjacent to the first region represents a second region. The second region may be used for fingerprint obtaining and recognition. In the figure, a dragging operation is represented as a dragging operation corresponding to any track from the location 1 to the location 2 of the shaded rectangular boxes. It should be understood that, FIG. 5 is only a schematic diagram in this embodiment of this application, and shapes, locations, sizes, and the like of the first region, the second region, and a control element are not limited. The dragging operation may be detected by monitoring a gesture. For example, a GestureDetector class provided by an Android system is used to recognize different gestures by using an onTouchEvent(event) method.

The dragging operation is different from the foregoing touch operation of determining that the first control element can be encrypted or decrypted. The dragging operation may be dragging the first control element from one location to another, and the touch operation of determining that the first control element can be encrypted or decrypted may be touching and holding, or the like. It should be understood that, this embodiment of this application is not limited thereto.

In an embodiment rather than a limiting embodiment, when the operation of dragging the first control element from the location outside the second region to the second region is detected, the first data corresponding to the first control element is encrypted or decrypted based on the fingerprint data obtained by the fingerprint recognition module. Specifically, whether encryption or decryption is to be performed may be based on a determining result of whether the first data corresponding to the first control element is in an encrypted state. For example, if it is determined that the first data is encrypted data, when the operation of dragging the first control element from the location outside the second region to the second region is detected, the first data corresponding to the first control element is decrypted based on the fingerprint data obtained by the fingerprint recognition module; or if it is determined that the first data is unencrypted data, when the operation of dragging the first control element from the location outside the second region to the second region is detected, the first data corresponding to the first control element is encrypted based on the fingerprint data obtained by the fingerprint recognition module.

Optionally, when the operation of dragging the first control element from the location outside the second region to the second region is detected, the terminal device is triggered to control the fingerprint recognition module to collect fingerprint data; and after it is determined that the fingerprint data is valid, the first data corresponding to the first control element is encrypted or decrypted.

Alternatively, before the operation of dragging the first control element from the location outside the second region to the second region is detected, the fingerprint recognition module is controlled to collect fingerprint data, and it is determined whether the fingerprint data is valid; and after it is determined that the fingerprint data is valid, the first data corresponding to the first control element is encrypted or decrypted. It should be understood that, this embodiment of this application is not limited thereto.

When the terminal device detects a coherent operation of dragging one or more control elements to a specific region range, this case may be used as a trigger manner to trigger the terminal device to complete data encryption or decryption based on the fingerprint data obtained by the fingerprint recognition module. Alternatively, the dragging operation may be used as a trigger manner to trigger the terminal device to control the fingerprint recognition module to collect fingerprint data. Alternatively, the dragging operation may be used as a trigger manner to trigger the terminal device to control the fingerprint recognition module to collect fingerprint data, determine whether the fingerprint data is valid, and after it is determined that the fingerprint data is valid, encrypt or decrypt the first data corresponding to the first control element. Such a method can complete operations of confirming that encryption or decryption is to be performed and performing authentication in one step, to shorten steps and time of the data encryption or decryption operation and make the operation more coherent, thereby improving user experience.

Figure 6:
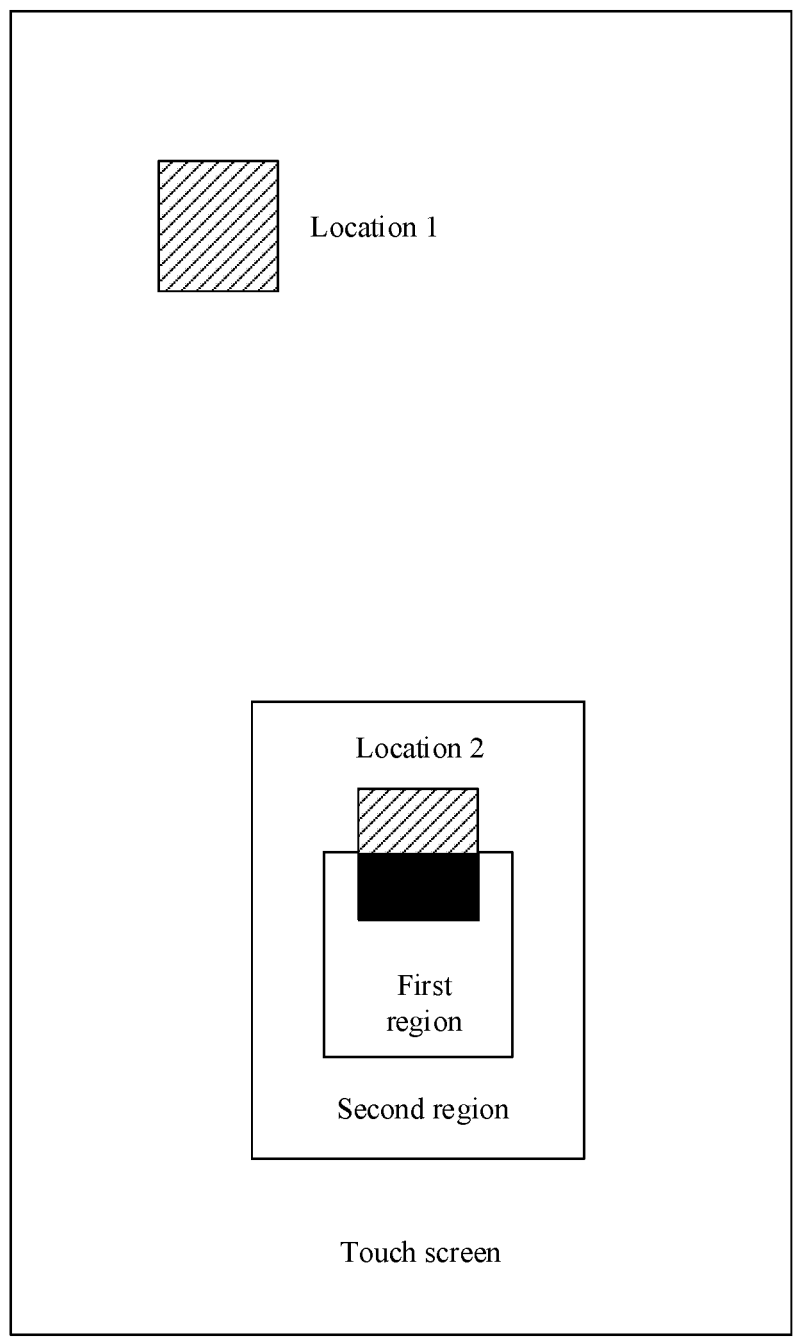
FIG. 6 shows an example of a data processing method according to an embodiment of this application.

When the operation of dragging the first control element from the location outside the second region to the second region is detected, and a range corresponding to an overlapping part between a region occupied by the first control element and the fingerprint recognition region determined by the fingerprint recognition module (that is, the first region) is greater than or equal to a specific preset value, the first data corresponding to the first control element is encrypted or decrypted based on the fingerprint data obtained by the fingerprint recognition module. As shown in a schematic diagram of FIG. 6, a black filling box in the figure is the overlapping part between the region occupied by the first control element and the fingerprint recognition region determined by the fingerprint recognition module (that is, the first region). When the range corresponding to the overlapping part is greater than or equal to the specific preset value, the first data corresponding to the first control element is encrypted or decrypted based on the fingerprint data obtained by the fingerprint recognition module. It should be understood that, FIG. 6 is only a schematic diagram in this embodiment of this application, and shapes, locations, sizes, and the like of the first region, the second region, and a control element are not limited.

Optionally, when the operation of dragging the first control element from the location outside the second region to the second region is detected, and a ratio of a range corresponding to an overlapping part between a region occupied by the first control element and the first region to a range occupied by the first control element is greater than or equal to a specific preset value, the first data corresponding to the first control element is encrypted or decrypted based on the fingerprint data obtained by the fingerprint recognition module. Alternatively, when a ratio of a range corresponding to an overlapping part between a region occupied by the first control element and the fingerprint recognition region to the fingerprint recognition region is greater than or equal to a specific preset value, the first data corresponding to the first control element is encrypted or decrypted based on the fingerprint data obtained by the fingerprint recognition module.

During detection performed by the terminal device, an operation process of dragging a control element is dragging the control element from a location outside the second region to a location in the second region. A range of the second region includes at least a partial region of the fingerprint recognition region determined by the fingerprint recognition module. However, that the operation is an operation used for data encryption and decryption can be ensured, only when the control element enters the fingerprint recognition region, that is, a region in which a fingerprint can be obtained and recognized. Therefore, in this embodiment, an overlapping area or an overlapping ratio between a range occupied by the one or more control elements and the fingerprint recognition region is detected to reduce a detection error, so as to prevent a misoperation. In addition, sufficient time can be reserved for a fingerprint recognition module to perform fingerprint recognition, thereby ensuring detection correctness and improving user experience. A display region of the one or more control elements and the fingerprint recognition region may be irregular graphs. Therefore, by determining that an overlapping ratio between a range occupied by the control element and the fingerprint recognition region is greater than or equal to a preset threshold, that this case triggers the terminal device to perform encryption, decryption, or the like can be determined. Such a method can prevent a misoperation and reduce an error detection rate, thereby ensuring detection correctness and improving user experience.

When the operation of dragging the first control element from the location outside the second region to the second region is detected, and a dwell time of the first control element in the second region is greater than or equal to a specific preset value, the first data corresponding to the first control element is encrypted or decrypted based on the fingerprint data obtained by the fingerprint recognition module.

In the process of detecting the dragging operation by the terminal device, a display location of the first control element changes according to a track of the dragging operation. The dwell time of the control element in the second region after the control element is dragged from the location outside the second region to the second region is limited, so as to prevent a misoperation and reduce an error detection rate. In addition, sufficient time can be reserved for the fingerprint recognition module to perform fingerprint recognition, thereby ensuring detection correctness and improving user experience.

Optionally, in another possible implementation, when the operation of dragging the first control element from the location outside the second region to the second region is detected, the operation may include a dragging operation from a first touch point to a second touch point, where the first touch point is located in a range of display locations of one or more control elements (that is, the first control element), and a location relationship between the second touch point and the first area meets a specific preset condition. When a display location of the first control element is outside the first region in which the projection of the fingerprint recognition module on the touch screen is located, the first control element needs to be moved, by using a dragging operation, from the current display location to the fingerprint recognition region determined by the fingerprint recognition module, that is, the first region.

When it is detected that a specified dragging operation is performed on the first control element, and a touch time of the second touch point is greater than or equal to a preset time threshold, the first data corresponding to the first control element is encrypted or decrypted based on the fingerprint data obtained by the fingerprint recognition module. During detection performed by the terminal device, the touch time of the second touch point during the dragging operation is detected. In this way, a misoperation can be prevented. In addition, sufficient time can be reserved for the fingerprint recognition module to perform fingerprint recognition, thereby ensuring detection correctness and improving user experience.

During detection performed by the terminal device, a location of the second touch point during the dragging operation is limited. To be specific, when the second touch point is located in the fingerprint recognition region determined by the fingerprint recognition module (the first region), fingerprint data detected by the fingerprint recognition module is obtained. In this way, a detection error can be reduced, and a misoperation can be prevented. In addition, sufficient time can be reserved for the fingerprint recognition module to perform fingerprint recognition, thereby ensuring detection correctness and improving user experience.

Figure 7:
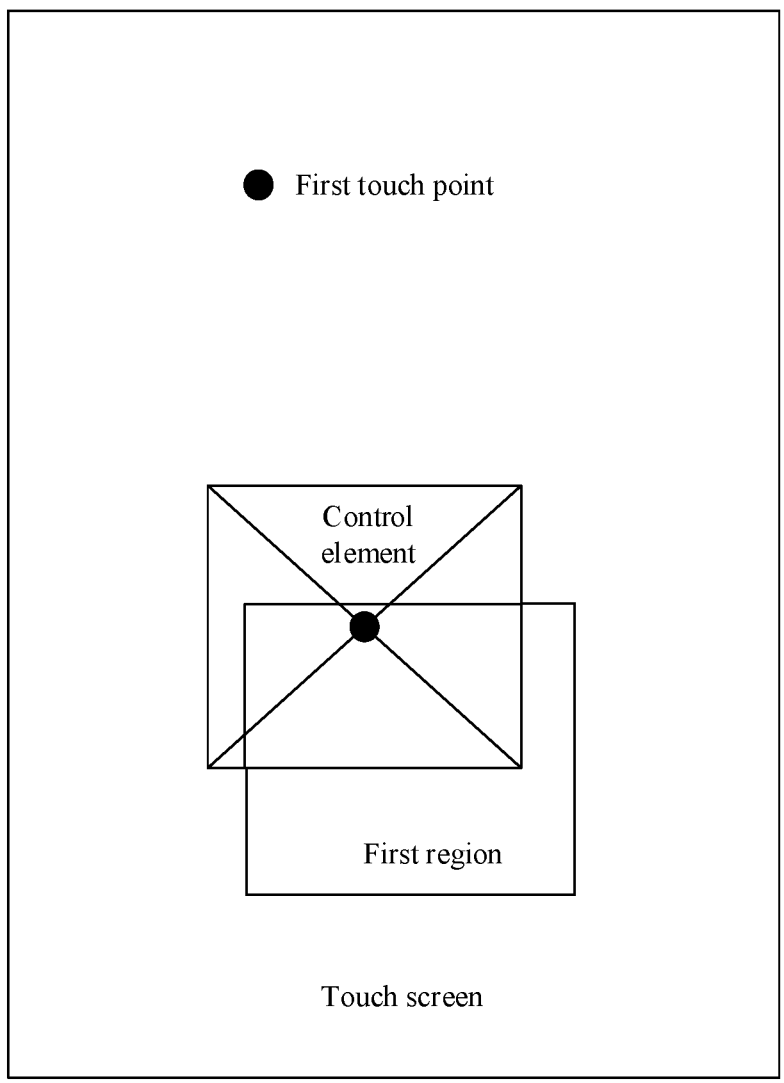
FIG. 7 shows an example of a data processing method according to an embodiment of this application.

Optionally, when it is detected that a specified dragging operation is performed on the first control element, and a central point of one or more control elements is located in the fingerprint recognition region, as shown in a schematic diagram of FIG. 7, the first data corresponding to the first control element is encrypted or decrypted based on the fingerprint data obtained by the fingerprint recognition module. It should be understood that, FIG. 7 is only a schematic diagram in this embodiment of this application, and shapes, locations, sizes, and the like of the first region and a control element are not limited. It should be understood that, a region in which a control element is presented may be an irregular graph, and a central point of the control element is a geometric central point of the graph, for example, may be a point of intersection of diameters or diagonals in the graph. Such a method can prevent a misoperation and reduce an error detection rate, thereby ensuring detection correctness and improving user experience.

Figure 8:
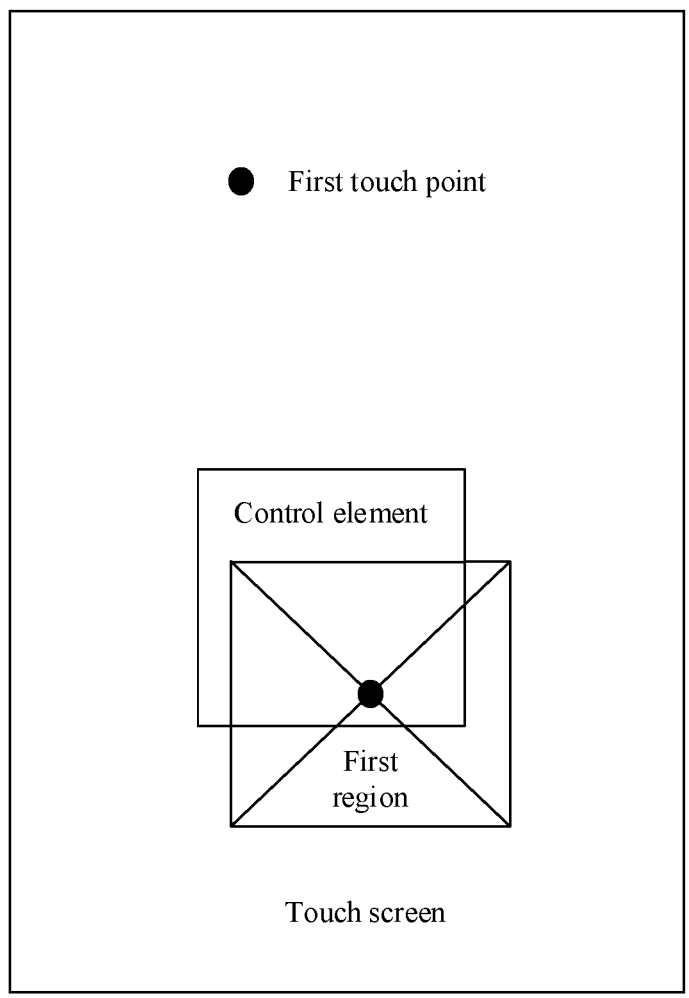
FIG. 8 shows an example of a data processing method according to an embodiment of this application.

Optionally, when it is detected that a specified dragging operation is performed on the first control element, and a part of the one or more control elements coincides with a central point of the fingerprint recognition region, as shown in a schematic diagram of FIG. 8, fingerprint data detected by the fingerprint recognition module is obtained. It should be understood that, FIG. 8 is only a schematic diagram in this embodiment of this application. Shapes, locations, and the like of the first region and a control element are not limited, and a location and the like of the first touch point are not limited either. It should be understood that, the first region may be an irregular graph, and a central point of the first region is a geometric central point of the first region, for example, may be a point of intersection of diameters or diagonals in the graph. Such a method can prevent a misoperation and reduce an error detection rate, thereby ensuring detection correctness and improving user experience.

Optionally, when it is detected that a specified dragging operation is performed on the first control element, and an overlapping ratio between the first region and a third region that uses the second touch point as a center is greater than or equal to a preset threshold, the overlapping ratio is defined as a ratio of an overlapping area to an area of the first region or the third region, and the following may be set: When a ratio of an overlapping area of a shaded part to the area of the first region is greater than or equal to N %, or when a ratio of an overlapping area of a shaded part to the area of the third region is greater than or equal to M %, the fingerprint data detected by the fingerprint recognition module is obtained. N and M are greater than 0. It should be understood that, this setting is a possible implementation of this embodiment of this application, and this embodiment of this application is not limited thereto.

Because the display region of the one or more control elements and the fingerprint recognition region may be irregular graphs, when an overlapping ratio between the first region and a second region that uses the second touch point as a center is greater than or equal to a preset second threshold, that the fingerprint data detected by the fingerprint recognition module can be obtained can be determined. The central point may be a point of intersection of diameters or diagonals in the graph. Such a method can prevent an incorrect operation and reduce an error detection rate, thereby ensuring detection correctness and improving user experience.

Optionally, when it is detected that a specified dragging operation is performed on the first control element, and a touch time of the first touch point is greater than or equal to a preset time threshold, the first data corresponding to the first control element is encrypted or decrypted based on the fingerprint data obtained by the fingerprint recognition module.

It should be understood that, when the touch time of the first touch point is greater than or equal to a preset time threshold, the first control element is determined as an interface element that may be moved. In addition, during the dragging operation, a display location of the first control element is also in a constantly changing state according to a dragging track of the dragging operation. During detection performed by the terminal device, there may be a plurality of cases. For example, during dragging, the second touch point is not in the first region, or the overlapping ratio between the first region and the second region that uses the second touch point as a center is not greater than or equal to the preset second threshold. During dragging, the display location of the first control element changes according to the track of the dragging operation. By limiting the touch time of the first touch point of the dragable interface element to be greater than or equal to the preset second time threshold, an occasion for starting to obtain fingerprint data is determined. Such a method can prevent a misoperation and reduce an error detection rate, thereby ensuring detection correctness and improving user experience.

The foregoing describes a plurality of occasions at which the fingerprint recognition module starts to obtain fingerprint data. It should be understood that, the foregoing is only a possible implementation of this embodiment of this application, and this embodiment of this application is not limited thereto.

In a data encryption processing process, when recognizing a valid fingerprint, the fingerprint recognition module sets the fingerprint as a preset fingerprint. The preset fingerprint is set as a permission password for accessing data subsequently. After the terminal device completes the setting, the encryption process is completed. When recognizing a valid fingerprint, the fingerprint recognition module automatically compares the fingerprint with a preset fingerprint, and if the preset fingerprint is empty or there is no preset fingerprint, the fingerprint recognition module sets the fingerprint as a preset fingerprint. The preset fingerprint is a permission password for accessing data subsequently. After the terminal device completes the setting, the encryption process is completed.

In a data decryption processing process, when recognizing a fingerprint, the fingerprint recognition module compares the recognized fingerprint with a preset fingerprint, that is, performs authentication. When the currently recognized fingerprint is consistent with the preset fingerprint, that is, fingerprint data is valid, decryption is performed to revoke a confidentiality permission for the data, so that the data can be accessed. After the terminal device completes the setting, the encryption process is completed.

Various algorithms such as a symmetric algorithm, an asymmetric algorithm, and a hash algorithm may be used in the data encryption and decryption processing processes. The symmetric encryption algorithm is used to encrypt information such as sensitive data. Common algorithms include: a data encryption standard DES (Data Encryption Standard, DES) algorithm applicable to a scenario in which a large amount of data is encrypted, where the DES algorithm has a relatively high speed; a DES-based 3DES (Triple DES, 3DES) algorithm that is used to encrypt a piece of data three times by using three different keys and that has relatively high strength; and an advanced encryption standard AES (Advanced Encryption Standard, AES) algorithm that is a next-generation encryption algorithm standard and that has a high speed and security level.

Asymmetric encryption algorithms include: a public key algorithm RSA that supports a variable-length key, where a length of a file block that needs to be encrypted is also variable; a digital signature algorithm (DSA); an elliptic curve cryptography (ECC) algorithm; and the like. Compared with the RSA, the ECC has absolute advantages in many aspects, mainly including the following aspects: The ECC has strong anti-attack performance, and has anti-attack performance many times higher than the RSA for a same key length; and the ECC has small computing workload and a high processing speed. A total speed of the ECC is much higher than that of the RSA and the DSA, and the ECC occupies small storage space. A key size and a system parameter of the ECC are much smaller than those of the RSA and the DSA, and this means that the ECC occupies much smaller storage space than the RSA and the DSA; and the EEC has a low bandwidth requirement. For encryption and decryption of long messages, the three types of cryptosystems have a same bandwidth requirement. However, when the three types of cryptosystems are applied to SMS messages, the ECC has a much lower bandwidth requirement. Due to the low bandwidth requirement, the ECC has broad application prospects in the wireless network field. In a hash encryption algorithm, a hash is an abstract of information, and usually has a fixed length much shorter than the information. A hash with strong cryptographic performance is definitely irreversible. This means that no part of original information can be derived from a hash result. Any change in input information, even one bit, leads to a significant change in a hash result. This is referred to as an avalanche effect. A hash also needs to have an anti-collision function, that is, two pieces of information with a same hash result cannot be found. A hash result with these characteristics can be used to verify whether information is modified. A one-way hash algorithm is generally used to generate a message digest, encryption key, and the like. Common one-way hash algorithms include: a one-way hash algorithm such as Message Digest Algorithm 5 (MD5) that is irreversible and in which a same ciphertext is generated from a same plaintext; and a Secure Hash Algorithm (SHA) algorithm used to perform an operation on data of any length to generate a 160-bit value.

Because an asymmetric encryption algorithm runs much slower than a symmetric encryption algorithm, when a large amount of data needs to be encrypted, the symmetric encryption algorithm is recommended for use, so as to increase encryption and decryption speeds. The symmetric encryption algorithm cannot implement signature. Therefore, to implement signature, only an asymmetric algorithm can be used. Key management of the symmetric encryption algorithm is a complex process, and key management directly determines security of the symmetric encryption algorithm. Therefore, when there is a quite small amount of data, using the asymmetric encryption algorithm may be considered.

In an actual operation process, a manner usually used is as follows: An asymmetric encryption algorithm is used to manage a key of a symmetric algorithm, and then the symmetric encryption algorithm is used to encrypt data. In this way, advantages of the two types of encryption algorithms are integrated. This not only implements a high encryption speed but also implements secure and convenient key management.

In the prior art, the terminal device pops up an authentication manner, performs a next step such as verifying a fingerprint or entering a password for user authentication only after determining that authentication is to be performed, and completes an encryption or decryption process only after the authentication succeeds. Consequently, operations are complex and time-consuming, and user experience is poor. In the data encryption or decryption method provided in this embodiment of this application, based on the fingerprint recognition module disposed on a screen of the touch screen, the terminal device detects a coherent dragging action to complete operations of confirming that encryption or decryption is to be performed and performing authentication in one step. When detecting that one or more control elements are dragged to a fingerprint recognition region determined by the fingerprint recognition module, the terminal device obtains fingerprint data, and completes data encryption or decryption when the fingerprint data is valid. Such a method can complete the operations of confirming that encryption or decryption is to be performed and performing authentication in one step, to shorten steps and time of the data encryption or decryption operation and make the operation more coherent, thereby improving user experience.

Figure 9:
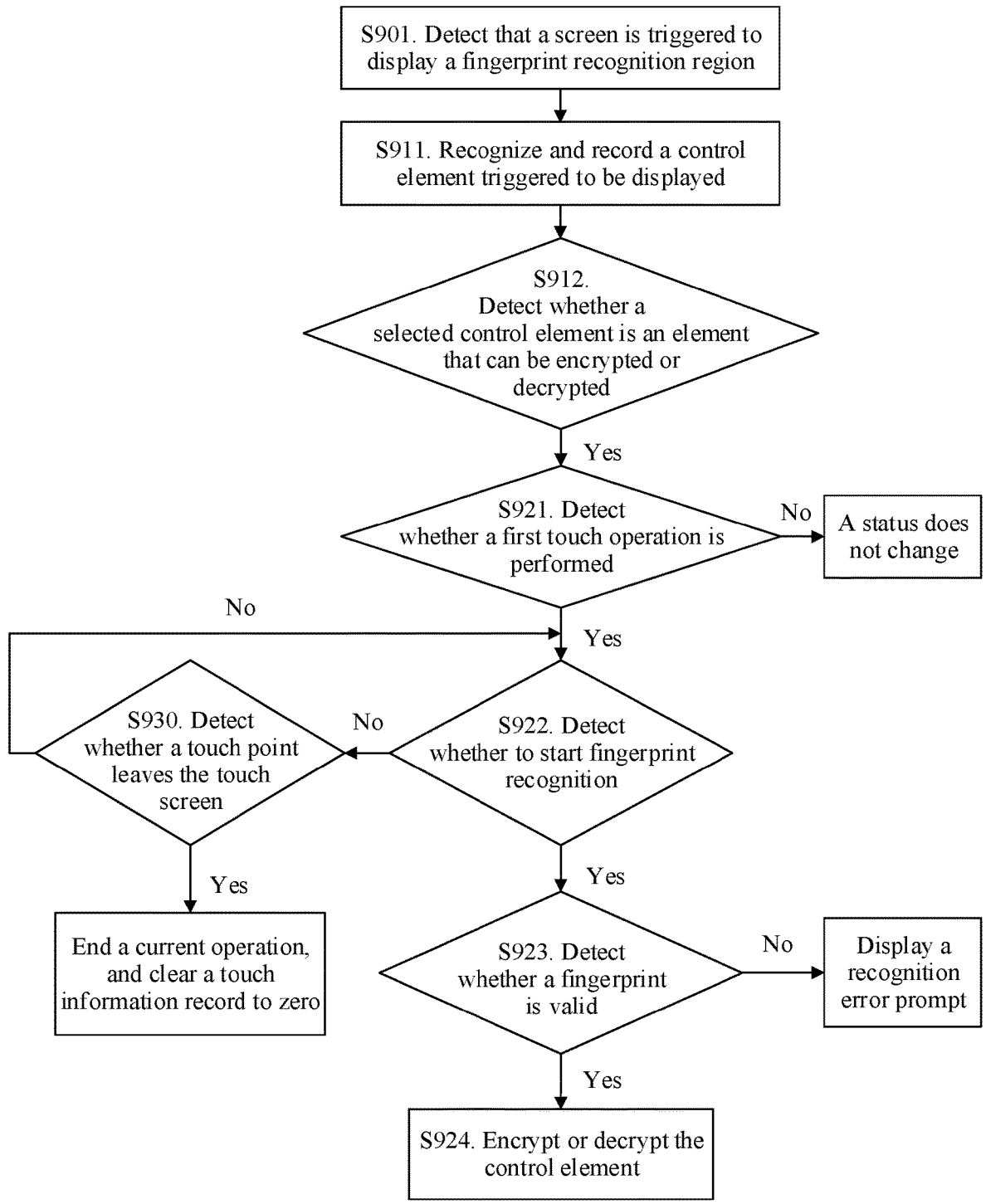
FIG. 9 is another schematic flowchart of a data processing method according to an embodiment of this application.

During actual use of the terminal device, not only steps and time of a data encryption or decryption operation need to be shortened to make the operation more coherent, prevent a misoperation, and improve detection accuracy, thereby improving user experience, but also a purpose of energy saving needs to be achieved. Therefore, during general use of the terminal device, no fingerprint recognition region needs to be displayed on the touch screen. FIG. 9 is another schematic flowchart of a data processing method according to an embodiment of this application.

As shown in FIG. 9, when a touch screen does not display a fingerprint recognition region, to encrypt or decrypt data by using the method provided in this embodiment of this application, a terminal device needs to be triggered to display the fingerprint recognition region on the touch screen.

S901. Detect that the touch screen is triggered to display the fingerprint recognition region, where there are a plurality of trigger manners. For example, a specified touch operation, touching and holding the touch screen, or a dragging operation may be performed.

S911 to S912 are corresponding to S410 in FIG. 4, that is, identify and record a control element that is displayed through triggering, and determine that the selected control element is a control element that can be encrypted or decrypted. A specific method and process are described in S410, and details are not described herein again.

S921 to S924 are corresponding to S420 in FIG. 4, that is, when it is detected that a specified dragging operation is performed on a first control element, encrypt or decrypt, based on fingerprint data obtained by a fingerprint recognition module, first data corresponding to the first control element. When the terminal device does not detect the dragging operation, a status of the selected control element does not change. When it is determined that the fingerprint data is valid, the first data corresponding to the first control element is encrypted or decrypted. A specific method and process are described in S420, and details are not described herein by using examples one by one. When determining that the obtained fingerprint is invalid, the terminal device displays a recognition error to inform a user that the encryption or decryption fails.

During detection performed by the terminal device, to implement energy saving of the terminal device, there may be a plurality of cases. For example, the fingerprint recognition region determined by the fingerprint recognition module is not displayed on the touch screen. In this case, to accurately and quickly drag one or more control elements to the fingerprint recognition region, presenting a location of a first region, that is, a first graph, on the touch screen needs to be triggered first. There are a plurality of trigger manners, for example, touching and holding the touch screen. This embodiment of this application is not limited thereto. Such an operation can display the fingerprint recognition region, that is, the first region, so as to identify a second region, and ensure that the one or more control elements are accurately and quickly dragged to the fingerprint recognition region. This not only can save energy, but also prevent a misoperation, and shorten time for data encryption or decryption, thereby improving user experience.

Figure 10:
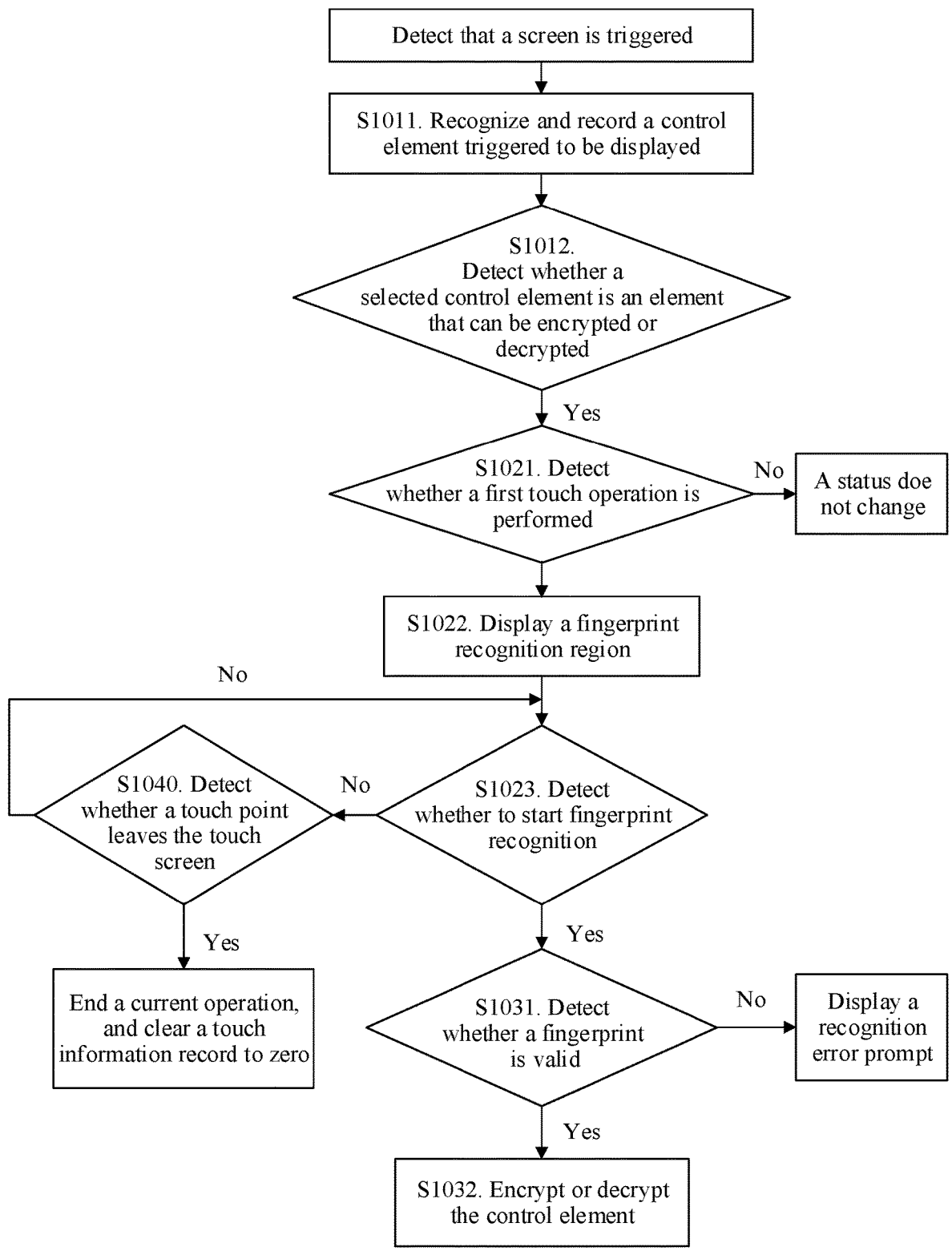
FIG. 10 is another schematic flowchart of a data processing method according to an embodiment of this application.

Optionally, when the fingerprint recognition region is not displayed on the touch screen, there are a plurality of trigger manners, and the touch screen may be triggered to display the fingerprint recognition region at different occasions. FIG. 10 is another schematic flowchart of a data processing method according to an embodiment of this application. In the method in FIG. 10, when a fingerprint recognition region is not displayed, no specified trigger operation is performed first on a touch screen, and an operation of selecting one or more control elements cannot trigger display of the fingerprint recognition region, display of the fingerprint recognition region may be triggered by using a dragging operation. A specific implementation process is similar to that described above, and details are not described herein again.

Figure 11:
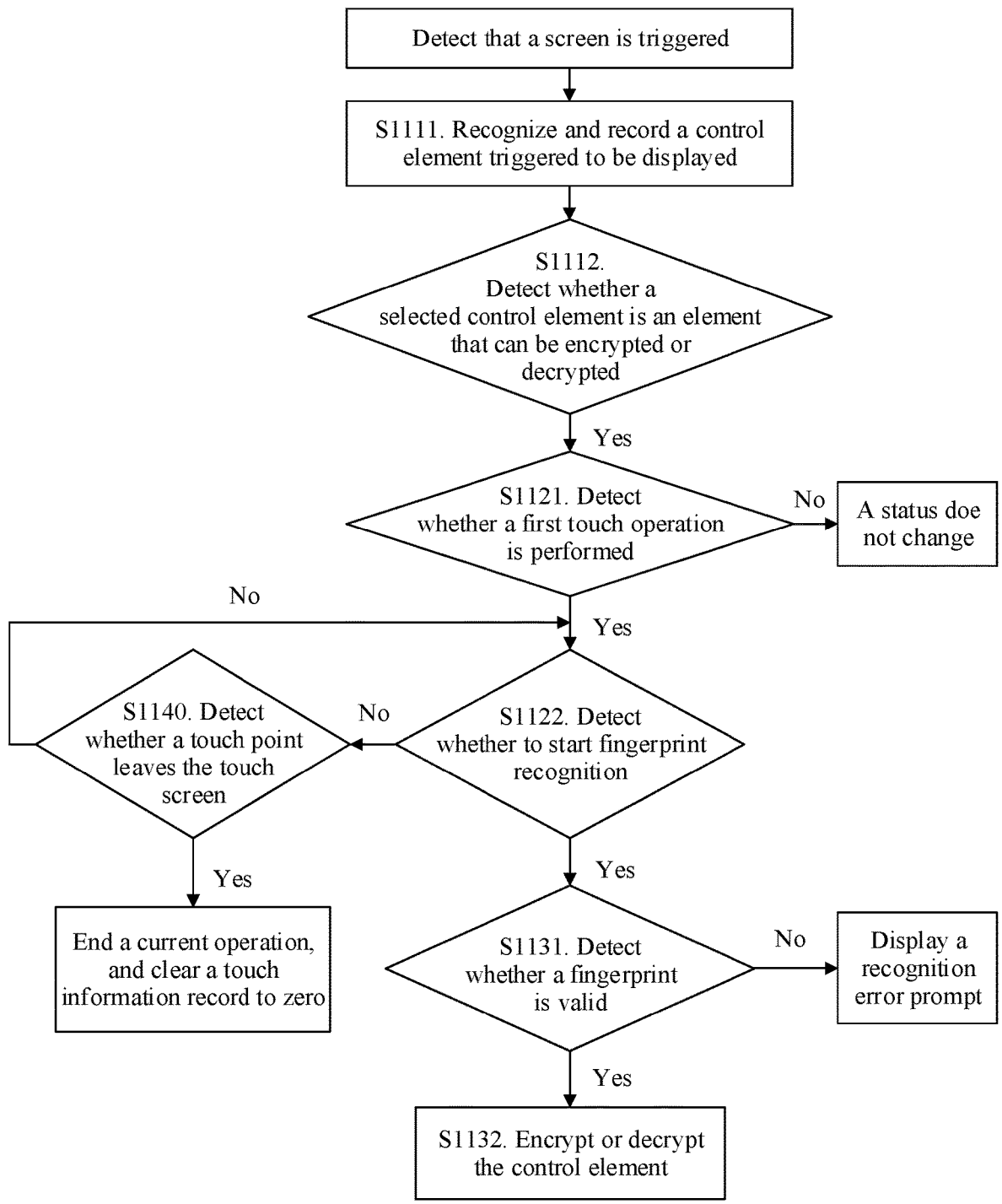
FIG. 11 is another schematic flowchart of a data processing method according to an embodiment of this application.

Optionally, when the fingerprint recognition region is displayed on the touch screen, no trigger operation is required for triggering. A control element that needs to be encrypted or decrypted may be directly selected, and the control element is dragged to the fingerprint recognition region; and first data corresponding to a first control element is encrypted or decrypted based on fingerprint data obtained by a fingerprint recognition module. A specific flowchart is shown by FIG. 11. FIG. 11 is another schematic flowchart of a data processing method according to an embodiment of this application. A specific implementation process is similar to that described above, and details are not described herein again.

According to the data encryption or decryption method provided in this embodiment of this application, based on the fingerprint recognition module disposed on a screen of the touch screen, the terminal device detects this coherent dragging action to complete operations of confirming that encryption or decryption is to be performed and performing authentication in one step. When detecting that one or more control elements are dragged to a fingerprint recognition region determined by the fingerprint recognition module, the terminal device obtains fingerprint data, and completes data encryption or decryption when the fingerprint data is valid. Such a method can complete the operations of confirming that encryption or decryption is to be performed and performing authentication in one step, to shorten steps and time of the data encryption or decryption operation and make the operation more coherent, prevent a misoperation, and improve detection accuracy, thereby improving user experience and achieving energy saving.

Specifically, in an actual operation process of the terminal device, not only one content control element can be encrypted or decrypted independently, but also a plurality of content control elements can be simultaneously encrypted or decrypted through touch and hold multi-selection.

Figure 12:
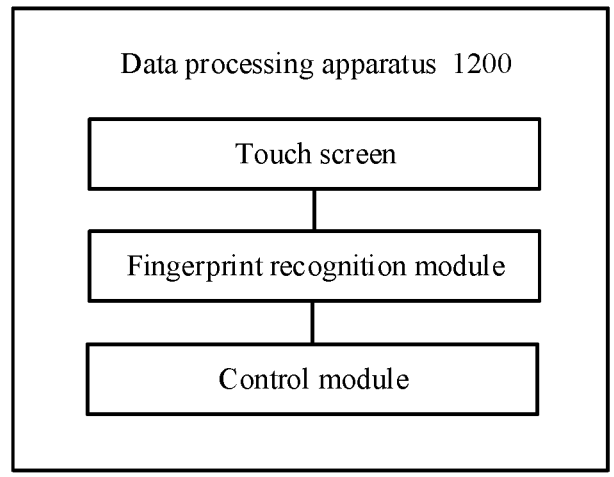
FIG. 12 is a schematic block diagram of a data processing apparatus according to an embodiment of this application.

FIG. 12 is a schematic block diagram of a data processing apparatus 1200 according to an embodiment of this application. The data processing apparatus 1200 may correspond to the terminal device described in the method 400. In addition, modules or units in the data processing apparatus 1200 are separately configured to perform actions and processing processes performed by the terminal device in the method 400. To avoid repetition, detailed descriptions are omitted herein.

Figure 13:
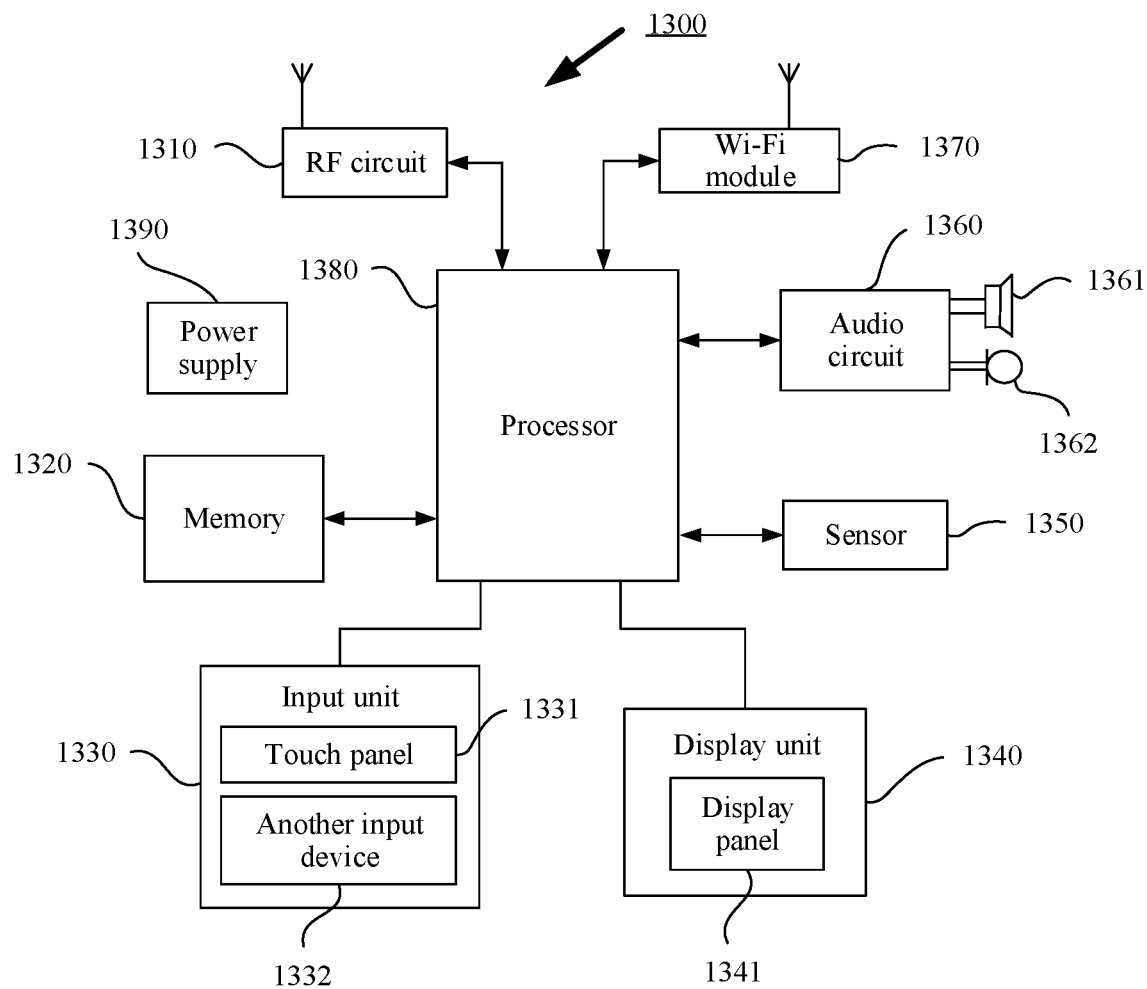
FIG. 13 is a schematic structural diagram of a terminal device according to an embodiment of this application.

FIG. 13 is a schematic structural diagram of a terminal device according to an embodiment of this application.

A mobile phone 1300 shown in FIG. 13 is used as an example to describe a terminal device or User Equipment (UE) to which this application is applicable. In this embodiment of this application, the mobile phone may include components such as a radio frequency (RF) circuit 1310, a memory 1320, an input unit 1330, a display unit 1340, a sensor 1350, an audio circuit 1360, a wireless fidelity (Wi-Fi) module 1370, a processor 1380, and a power supply 1390.

In addition, a person skilled in the art may understand that a structure of the mobile phone shown in FIG. 13 is only an example instead of a limitation, and the mobile phone may include more or fewer components than those shown in the figure, or combine some components, or have different component arrangements.

The RF circuit 1310 may be configured to: receive and send a signal in an information receiving and sending process or a call process; particularly, after receiving downlink information of a base station, send the downlink information to the processor 1380 for processing; and send uplink data of the mobile phone to the base station. Generally, the RF circuit 1310 includes but is not limited to an antenna, one or more amplifiers, a transceiver, a coupler, a low noise amplifier (LNA), a duplexer, and the like. In addition, the RF circuit 1310 may further communicate with a network and another device through wireless communication. Any communication standard or protocol may be used in the wireless communication, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 1320 may be configured to store a software program and a module. The processor 1380 performs various function applications and data processing of the mobile phone by running the software program and the module that are stored in the memory 1320. The memory 1320 may mainly include a program storage area and a data storage area. The program storage area may store an operating system, an application program required by one or more functions (such as a voice playback function and an image playback function), and the like. The data storage area may store data (such as audio data or a phone book) created based on use of the mobile phone, and the like. In addition, the memory 1320 may include a high-speed random access memory, or may include a nonvolatile memory, such as one or more magnetic disk storage devices, a flash memory, or another volatile solid-state storage device.

The input unit 1330 may be configured to: receive entered digit or character information, and generate a key signal related to user setting and function control of the mobile phone 1300. Specifically, the input unit 1330 may include a touch panel 1331 and another input device 1332. The touch panel 1331 is also referred to as a touch screen. The touch panel 1331 may collect a touch operation performed by a user on or near the touch panel 1331 (such as an operation performed by the user on the touch panel 1331 or near the touch panel 10031 by using any proper object or accessory, such as a finger or a stylus), and drive a corresponding connection apparatus according to a preset program. Optionally, the touch panel 1331 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 1380, and can receive and execute a command sent by the processor 1380. In addition, the touch panel 1331 may be implemented by using a plurality of types, such as a resistive type, a capacitive type, an infrared type, and a surface acoustic wave type. In addition to the touch panel 1331, the input unit 1330 may further include the another input device 1332. Specifically, the another input device 1332 may include but is not limited to one or more of a physical keyboard, a function key (for example, a volume control key or an on/off key), a trackball, a mouse, a joystick, and the like.

The display unit 1340 may be configured to display information entered by the user, information provided for the user, and various menus of the mobile phone. The display unit 1340 may include a display panel 1341. Optionally, the display panel 1341 may be configured in a form of a liquid crystal display (LCD), an organic light-emitting diode (OLED), or the like. Further, the touch panel 1331 may cover the display panel 1341. When detecting a touch operation on or near the touch panel 1331, the touch panel 1331 transmits the touch operation to the processor 1380 to determine a type of a touch event, and then the processor 1380 provides a corresponding visual output on the display panel 1341 based on the type of the touch event.

A location of the visual output that is on the external display panel 1341 and that can be identified by human eyes may be used as a "display area" described below. In FIG. 13, the touch panel 1331 and the display panel 1341 are used as two independent components to implement input and output functions of the mobile phone. However, in some embodiments, the touch panel 1331 and the display panel 1341 may be integrated to implement the input and output functions of the mobile phone.

In addition, the mobile phone 1300 may further include the at least one sensor 1350, for example, a fingerprint recognition sensor, a light sensor, and another sensor.

Specifically, the fingerprint recognition sensor may be a fingerprint collection sensor such as an optical sensor, a capacitor sensor, or an ultrasonic sensor. It should be understood that this embodiment of this application is not limited thereto.

In this embodiment of this application, the fingerprint recognition sensor listed above may be used as an element for obtaining fingerprint data, but this is not limited thereto. Other sensors that can obtain fingerprint data all fall within the protection scope of this application.

In addition, in this embodiment of this application, as the sensor 1350, other sensors such as a barometer, a hygrometer, a thermometer, and an infrared sensor may be further configured. Details are not described herein.

The optical sensor may include an ambient light sensor and a proximity sensor. The ambient light sensor may adjust brightness of the display panel 1341 based on illuminance of ambient light, and the proximity sensor may close the display panel 1341 and/or backlight when the mobile phone is moved to an ear.

The audio circuit 1360, a loudspeaker 1361, and a microphone 1362 may provide an audio interface between the user and the mobile phone. The audio circuit 1360 may transmit, to the loudspeaker 1361, an electrical signal that is obtained after received audio data is converted, and the loudspeaker 1361 converts the electrical signal into an acoustic signal for outputting. In addition, the microphone 1362 converts a collected acoustic signal into an electrical signal, and the audio circuit 1360 converts the electrical signal into audio data after receiving the electrical signal, and then outputs the audio data to the processor 1380 for processing. After processing, the audio data is sent to, for example, another mobile phone, by using the RF circuit 1310, or the audio data is output to the memory 1320 for further processing.

Wi-Fi is a short-distance wireless transmission technology. By using the Wi-Fi module 1370, the mobile phone may help the user send and receive an email, browse a web page, access streaming media, and the like. The Wi-Fi module 1370 provides wireless access to the broadband internet for the user. Although FIG. 13 shows the Wi-Fi module 1370, it can be understood that the Wi-Fi module 1370 is not a mandatory component of the mobile phone 1300, and the Wi-Fi module 1370 may be omitted as required, provided that the scope of the essence of this application is not changed.

The processor 1380 is a control center of the mobile phone, connects all parts of the entire mobile phone by using various interfaces and lines, and performs various functions and data processing of the mobile phone by running or executing the software program and/or the module stored in the memory 1320 and invoking data stored in the memory 1320, to perform overall monitoring on the mobile phone. Optionally, the processor 1380 may include one or more processing units. Preferably, an application processor and a modem processor may be integrated into the processor 1380. The application processor mainly processes an operating system, a user interface, an application program, and the like. The modem processor mainly processes wireless communication.

It can be understood that the modem processor may not be integrated into the processor 1380.

In addition, the processor 1380 may be used as an implementation element of the processing unit, to perform a function that is the same as or similar to that of the processing unit.

In this embodiment of this application, the control module is equivalent to the processor 1380 of the mobile phone, and performs the data processing method in this embodiment of this application.

The mobile phone 1300 further includes the power supply 1390 (such as a battery) that supplies power to each component.

Preferably, the power supply 1390 may be logically connected to the processor 1380 by using a power management system, to implement functions such as charging management, discharging management, and power consumption management by using the power management system. Although not shown, the mobile phone 1300 may further include a Bluetooth module and the like, and details are not described herein again.

It should be noted that the mobile phone shown in FIG. 13 is merely an example of the terminal device. This is not particularly limited in this application. This application may be applied to an intelligent device such as a mobile phone or a tablet computer. This is not limited in this application.

A person of ordinary skill in the art may be aware that, units and algorithm steps of the examples described in combination with the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It can be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
presenting one or more control elements on a touch screen of a terminal device, wherein each of the one or more control elements corresponds to a piece of data, the terminal device includes a fingerprint recognition module, the touch screen is parallel to a configuration plane of the fingerprint recognition module, a projection of the fingerprint recognition module on the touch screen is located in a first region, and the first region includes a part of the touch screen; and
encrypting or decrypting, based on fingerprint data obtained by the fingerprint recognition module, first data corresponding to a first control element when an operation of dragging the first control element from a location outside a second region into the second region is detected, wherein the second region is within a boundary of the touch screen and comprises at least a part of the first region,
wherein before an operation of dragging the first control element from a location outside a second region into the second region is detected, the method further comprises:
controlling the fingerprint recognition module to collect the fingerprint data, and determining whether the fingerprint data is valid,
wherein encrypting or decrypting, based on fingerprint data obtained by the fingerprint recognition module, first data corresponding to a first control element comprises:
after it is determined that the fingerprint data is valid, encrypting or decrypting the first data corresponding to the first control element, and
wherein encrypting or decrypting, based on fingerprint data obtained by the fingerprint recognition module, first data corresponding to a first control element when an operation of dragging the first control element from a location outside a second region into the second region is detected comprises:
when the operation of dragging the first control element from the location outside the second region into the second region is detected, and a first overlapping range is greater than or equal to a first preset value, encrypting or decrypting, based on the fingerprint data obtained by the fingerprint recognition module, the first data corresponding to the first control element, wherein the first overlapping range is a range corresponding to an overlapping part between the first control element and the first region; or
when the operation of dragging the first control element from the location outside the second region into the second region is detected, and a first overlapping ratio is greater than or equal to a second preset value, encrypting or decrypting, based on the fingerprint data obtained by the fingerprint recognition module, the first data corresponding to the first control element, wherein the first overlapping ratio is a ratio of a range corresponding to an overlapping part between the first control element and the first region to a range occupied by the first control element, or the first overlapping ratio is a ratio of a range corresponding to an overlapping part between the first control element and the first region to the first region.

2. The method according to claim 1, wherein encrypting or decrypting, based on fingerprint data obtained by the fingerprint recognition module, first data corresponding to a first control element when an operation of dragging the first control element from a location outside a second region into the second region is detected comprises:
when the operation of dragging the first control element from the location outside the second region into the second region is detected, controlling the fingerprint recognition module to collect the fingerprint data; and after it is determined that the fingerprint data is valid, encrypting or decrypting the first data corresponding to the first control element.

3. The method according to claim 1, wherein encrypting or decrypting, based on fingerprint data obtained by the fingerprint recognition module, first data corresponding to a first control element when an operation of dragging the first control element from a location outside a second region into the second region is detected comprises:
when the operation of dragging the first control element from the location outside the second region into the second region is detected, and a dwell time of the first control element in the second region is greater than or equal to a third preset value, encrypting or decrypting, based on the fingerprint data obtained by the fingerprint recognition module, the first data corresponding to the first control element.

4. The method according to claim 3, wherein before encrypting or decrypting, based on fingerprint data obtained by the fingerprint recognition module, first data corresponding to a first control element when an operation of dragging the first control element from a location outside a second region into the second region is detected, the method further comprises:
presenting a first graph on the touch screen, wherein the first graph is used to identify a location of the second region.

5. The method according to claim 4, wherein presenting a first graph comprises:
presenting the first graph when a trigger operation is detected.

6. The method according to claim 5, wherein the trigger operation comprises a touch and hold operation on the first control element.

7. An apparatus, comprising one or more processors and one or more memories coupled to the one or more processors, wherein
the one or more memories are configured to store a computer program code, wherein the computer program code comprises a computer instruction; and
the one or more processors are configured to execute the computer instruction and implement the following functions:
instructing a touch screen connected to the apparatus to present one or more control elements, wherein each of the one or more control elements corresponds with one or more pieces of data; and
when an operation of dragging a first control element from a location outside a second region into the second region is detected, encrypting or decrypting, based on fingerprint data obtained by a fingerprint recognition module, first data corresponding to the first control element, wherein the second region is within a boundary of the touch screen and comprises at least a part of a first region,
wherein the one or more processors are further configured to:
control the fingerprint recognition module to collect the fingerprint data, and determine whether the fingerprint data is valid,
wherein the one or more processors are further configured to:
after it is determined that the fingerprint data is valid, encrypt or decrypt the first data corresponding to the first control element, and
wherein the one or more processors are further configured to:
when the operation of dragging the first control element from the location outside the second region into the second region is detected, and a first overlapping range is greater than or equal to a first preset value, encrypt or decrypt, based on the fingerprint data obtained by the fingerprint recognition module, the first data corresponding to the first control element, wherein the first overlapping range is a range corresponding to an overlapping part between the first control element and the first region; or
when the operation of dragging the first control element from the location outside the second region into the second region is detected, and a first overlapping ratio is greater than or equal to a second preset value, encrypt or decrypt, based on the fingerprint data obtained by the fingerprint recognition module, the first data corresponding to the first control element, wherein the first overlapping ratio is a ratio of a range corresponding to an overlapping part between the first control element and the first region to a range occupied by the first control element, or the first overlapping ratio is a ratio of a range corresponding to an overlapping part between the first control element and the first region to the first region.

8. The apparatus according to claim 7, wherein the one or more processors are further configured to:
when the operation of dragging the first control element from the location outside the second region into the second region is detected, control the fingerprint recognition module to collect the fingerprint data; and
after it is determined that the fingerprint data is valid, encrypt or decrypt the first data corresponding to the first control element.

9. The apparatus according to claim 7, wherein the one or more processors are further configured to:
when the operation of dragging the first control element from the location outside the second region into the second region is detected, and a dwell time of the first control element in the second region is greater than or equal to a third preset value, encrypt or decrypt, based on the fingerprint data obtained by the fingerprint recognition module, the first data corresponding to the first control element.

10. The apparatus according to claim 9, wherein the one or more processors are further configured to:
instruct to present a first graph on the touch screen, wherein the first graph is used to identify a location of the second region.

11. The apparatus according to claim 10, wherein the one or more processors are further configured to:
present the first graph when a trigger operation is detected.

12. The apparatus according to claim 11, wherein the trigger operation comprises a touch and hold operation on the first control element.

13. The apparatus according to claim 12, wherein the one or more processors are further configured to:
when the operation of dragging the first control element from the location outside the second region into the second region is detected, and the first data is encrypted data, decrypt, based on the fingerprint data obtained by the fingerprint recognition module, the first data corresponding to the first control element; or
when the operation of dragging the first control element from the location outside the second region into the second region is detected, and the first data is unencrypted data, encrypt, based on the fingerprint data obtained by the fingerprint recognition module, the first data corresponding to the first control element.

14. A data processing method, comprising:

presenting a control element on a touch screen of a terminal device, wherein the control element corresponds with data to be processed, the touch screen includes a first region, and the control element is presented in an area outside the first region;

detecting, through the touch screen, an operation of dragging the control element, by a finger of a user, from the area outside the first region into the first region;

collecting fingerprint data of the finger of the user through a fingerprint recognition module of the terminal device when at least a part of the control element enters the first region, wherein the first region is within a boundary of the touch screen and comprises at least a part of an area, where a projection of the fingerprint recognition module on the touch screen is located; and processing the data corresponding to the control element based on the fingerprint data in response to entering of the control element into the first region, wherein before entering of the control element into the first region, the method further comprises:

determining whether the fingerprint data is valid, wherein processing the data corresponding to the control element based on the fingerprint data comprises:

after it is determined that the fingerprint data is valid, processing the data corresponding to the control element based on the fingerprint data, and wherein processing the data corresponding to the control element based on the fingerprint data in response to entering of the control element into the first region comprises:

in response to entering of the control element into the first region, and a first overlapping range is greater than or equal to a first preset value, processing the data corresponding to the control element based on the fingerprint data, wherein the first overlapping range is a range corresponding to an overlapping part between the control element and the first region; or in response to entering of the control element into the first region, and a first overlapping ratio is greater than or equal to a second preset value, processing the data corresponding to the control element based on the fingerprint data, wherein the first overlapping ratio is a ratio of a range corresponding to an overlapping part between the control element and the first region to a range occupied by the control element, or the first overlapping ratio is a ratio of a range corresponding to an overlapping part between the control element and the first region to the first region.

15. The data processing method of claim 14, wherein the fingerprint recognition module corresponds to the first region.

16. The data processing method of claim 14, wherein the touch screen further includes a second region including at least a part of the first region, and the method further comprises:

collecting the fingerprint data when the control element is in the second region.

\* \* \* \* \*